United States Patent
Wu et al.

(10) Patent No.: US 12,544,539 B2
(45) Date of Patent: Feb. 10, 2026

(54) ACTUATOR POWER APPARATUS AND SURGERY ASSISTANCE SYSTEM

(71) Applicant: ROBOGENIX MEDICAL SINGAPORE PTE. LTD., Singapore (SG)

(72) Inventors: Gang Wu, Shanghai (CN); Cunwang Ge, Shanghai (CN); Xueting Wei, Shanghai (CN); Hao Chen, Shanghai (CN)

(73) Assignee: ROBOGENIX MEDICAL SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 19/086,857

(22) Filed: Mar. 21, 2025

(65) Prior Publication Data

US 2025/0213819 A1     Jul. 3, 2025

Related U.S. Application Data

(63) Continuation of application No. PCT/CN2023/143084, filed on Dec. 29, 2023.

(30) Foreign Application Priority Data

Dec. 30, 2022   (CN) .......................... 202211735857.9
Dec. 30, 2022   (CN) .......................... 202211735941.0

(Continued)

(51) Int. Cl.
*A61M 25/01*     (2006.01)
*A61B 34/30*     (2016.01)
(Continued)

(52) U.S. Cl.
CPC ......... *A61M 25/0116* (2013.01); *A61B 34/30* (2016.02); *A61B 2034/305* (2016.02)

(58) Field of Classification Search
CPC .. A61M 2025/0004; A61M 2025/0175; A61B 2034/301; A61B 34/70
See application file for complete search history.

(56) References Cited

U.S. PATENT DOCUMENTS

2007/0060879 A1*   3/2007   Weitzner ............ A61M 25/1011
                                                         604/95.04
2009/0062602 A1    3/2009   Rosenberg et al.
(Continued)

FOREIGN PATENT DOCUMENTS

CN    110868902 A    3/2020
CN    113941082 A    1/2022
(Continued)

OTHER PUBLICATIONS

International Search Report for PCT/CN2023/143084, mailed Apr. 15, 2024, 8 pages.

(Continued)

*Primary Examiner* — Scott Luan
(74) *Attorney, Agent, or Firm* — Nixon & Vanderhye P.C.

(57) ABSTRACT

Disclosed are an actuation power apparatus and a surgical assistance system. The apparatus comprises: an outer sheath driving unit (11) drivingly connected to an outer sheath adapter (2) for supporting an outer sheath unit (201), and configured to actuate the outer sheath unit (201) through the outer sheath adapter (2); a middle sheath driving unit (12) drivingly connected to a middle sheath adapter (3) for supporting a middle sheath unit (202), and configured to actuate the middle sheath unit (202) through the middle sheath adapter (3); and an inner sheath driving unit (13) drivingly connected to an inner sheath adapter (4) for supporting an inner sheath unit (203), and configured to actuate the inner sheath unit (203) through the inner sheath adapter (4).

21 Claims, 24 Drawing Sheets

(30) Foreign Application Priority Data

Dec. 30, 2022 (CN) .......................... 202211737077.8
Dec. 30, 2022 (CN) .......................... 202211740994.1

(51) Int. Cl.
 *A61F 2/24* (2006.01)
 *A61F 2/95* (2013.01)

(56) References Cited

U.S. PATENT DOCUMENTS

| | | |
|---|---|---|
| 2011/0130718 A1 | 6/2011 | Kidd et al. |
| 2015/0094732 A1 | 4/2015 | Pacheco et al. |
| 2016/0235946 A1* | 8/2016 | Lewis .................... A61B 34/30 |
| 2021/0353419 A1 | 11/2021 | Kizuka et al. |
| 2022/0233263 A1 | 7/2022 | Canale et al. |

FOREIGN PATENT DOCUMENTS

| | | |
|---|---|---|
| CN | 114404108 A | 4/2022 |
| CN | 115003241 A | 9/2022 |
| CN | 115363766 A | 11/2022 |
| CN | 218889747 U | 4/2023 |
| CN | 219109850 U | 6/2023 |
| CN | 219109851 U | 6/2023 |
| CN | 219148062 U | 6/2023 |
| CN | 219538590 U | 8/2023 |
| WO | WO 99/45994 A1 | 9/1999 |

OTHER PUBLICATIONS

Written Opinion of the ISA for PCT/CN2023/143084, mailed Apr. 15, 2024, 5 pages.
Exteded European Search Report mailed Jan. 2, 2026 in European Application No. 23910902.8, 11 pages.

* cited by examiner

ACTUATOR POWER APPARATUS AND SURGERY ASSISTANCE SYSTEM

This application is a continuation of International Application No. PCT/CN2023/143084, filed on Dec. 29, 2023, which claims the priorities to Chinese Patent Application No. 202211735857.9 filed on Dec. 30, 2022, Chinese Patent Application No. 202211740994.1 filed on Dec. 30, 2022, Chinese Patent Application No. 202211737077.8 filed on Dec. 30, 2022, and Chinese Patent Application No. 202211735941.0 filed on Dec. 30, 2022, the entire disclosures of which are incorporated by reference herein.

TECHNICAL FIELD

The present disclosure relates to the field of medical device technology, for example, to an actuation power apparatus and a surgical assistance system.

BACKGROUND

The mitral valve, a unidirectional "valve" situated between the left atrium and the left ventricle, ensures the unidirectional flow of blood from the left atrium to the left ventricle. The mitral valve includes anterior and posterior leaflets. During left ventricular diastole, both leaflets open to allow blood to flow from the left atrium to the left ventricle. Conversely, during left ventricular systole, the chordae tendineae are stretched, preventing the leaflets from being pushed back into the left atrium by the blood flow. In a healthy mitral valve, the anterior and posterior leaflets close tightly, ensuring that blood flows from the left ventricle to the aorta via the aortic valve. However, in diseased states, the mitral valve fails to close properly during the left ventricular systole, as it would in a healthy state, which may cause the leaflets to be pushed back into the left atrium by the blood flow, leading to regurgitation. Consequently, a sharp increase in left atrial and pulmonary venous pressure may be caused, which increases the left ventricular diastolic volume load and may further result in a series of pathological changes such as left ventricular enlargement and pulmonary hypertension, ultimately leading to clinical manifestations such as heart failure and arrhythmia, which may be life-threatening in severe cases.

When repairing a diseased mitral valve, the opposite sides of the mitral valve can be clamped by a mitral valve repair instrument to reduce the distance between the valve leaflets, thereby decreasing the regurgitation area. However, in the prior art, passive minimally invasive surgical instruments for mitral valve repair require manual operations by surgeons. Certain complex instruments, due to their high operational difficulty, demand a relatively high level of technical skill and clinical experience from surgeons, resulting in prolonged learning curves, which to a certain extent restricts the development of surgical instruments and their clinical application.

SUMMARY

The present disclosure provides an actuation power apparatus and a surgical assistance system, which enable semi-automatic adjustment of the posture and position of the catheter system, thereby replacing the full manual operation by surgeons, thus reducing the difficulty of surgical procedures and shortening learning curves for surgeons.

An embodiment provides an actuation power apparatus adapted for driving a catheter system that includes an outer sheath unit, a middle sheath unit and an inner sheath unit.

The actuation power apparatus includes: an outer sheath driving unit drivingly connected to an outer sheath adapter for supporting the outer sheath unit, and configured to actuate the outer sheath unit through the outer sheath adapter; a middle sheath driving unit drivingly connected to a middle sheath adapter for supporting the middle sheath unit, and configured to actuate the outer sheath unit through the middle sheath adapter; and an inner sheath driving unit drivingly connected to an inner sheath adapter for supporting the inner sheath unit, and configured to actuate the inner sheath unit through the inner sheath adapter.

One embodiment provides a surgical assistance system including: a robotic device, an actuation power apparatus and a control device, where the robotic device includes a robotic arm and an actuation power apparatus connected to a distal end of the robotic arm, the robotic arm being configured to displace the actuation power apparatus; the actuation power apparatus includes a catheter system driving module and an adapter module, the adapter module being configured to support the catheter system, and the catheter system driving module being configured to actuate the catheter system through the adapter module; and the control device is electrically connected to the robotic device and has an operating terminal for controlling the robotic device.

Figure 1:
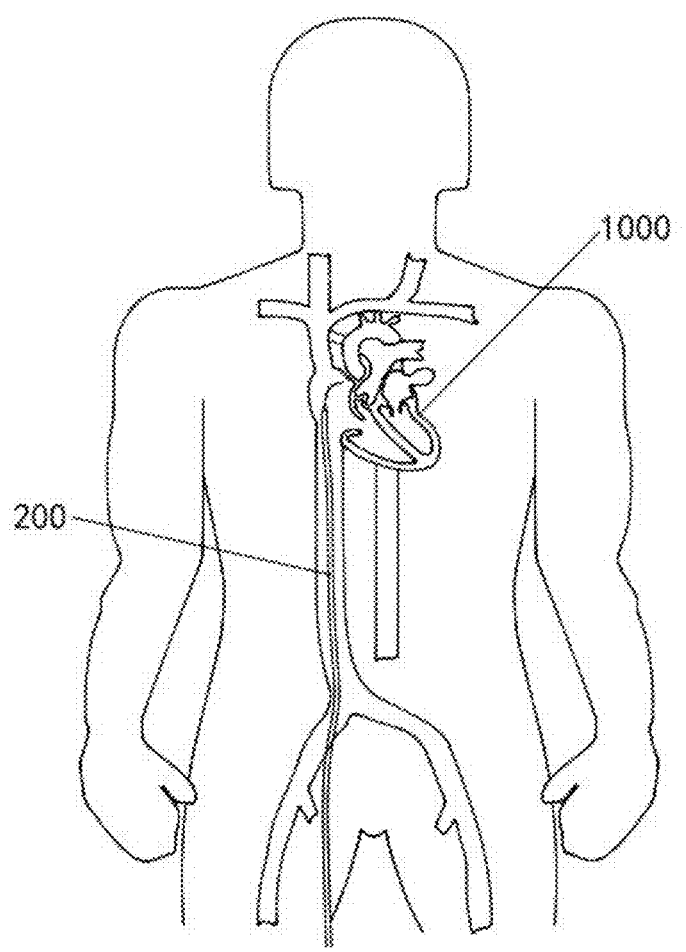
FIG. 1 is a schematic diagram of the human body structure involved in an embodiment of the present disclosure.

In the drawings:
1000: heart; 1001: right atrium; 1002: right ventricle; 1003: left atrium; 1004: left ventricle; 1005: atrial septum; 1006: mitral valve;
100: control device; 200: catheter system; 300: robotic arm; 400: medical cart; 500: actuation power apparatus;
201: outer sheath unit; 202: middle sheath unit; 203: inner sheath unit; 204: fixation element; 205: clamping element;
2011: outer sheath handle; 2012: outer sheath; 2013: outer sheath driving gear;
2021: middle sheath handle; 2022: middle sheath; 2023: first middle sheath driving wheel; 2024: second middle sheath driving wheel;
2031: inner sheath handle; 2032: inner sheath; 2033: inner sheath driving wheel; 2034: first operation lever; 2035: second operation lever; 2036: locking operation lever;
11: outer sheath driving unit; 11a: outer sheath bending drive assembly; 111a: outer sheath bending drive member; 112a: outer sheath bending transmission member; 113a: outer sheath bending drive shaft; 11b: outer sheath rotation drive assembly; 111b: outer sheath rotation drive member; 112b: outer sheath rotation transmission member; 113b: outer sheath rotation drive shaft;
12: middle sheath driving unit; 12a: first middle sheath bending drive assembly; 121a: first middle sheath bending drive member; 122a: first middle sheath bending transmission member; 123a: first middle sheath bending drive shaft; 12b: second middle sheath bending drive assembly; 121b: second middle sheath bending drive member; 122b: second middle sheath bending transmission member; 123b: second middle sheath bending drive shaft; 12c: middle sheath translation drive assembly; 121c: middle sheath translation drive member; 122c: middle sheath translation mounting plate;
13: inner sheath driving unit; 13a: inner sheath translation drive assembly; 131a: inner sheath translation drive member; 132a: inner sheath translation mounting plate;

13b: inner sheath rotation drive assembly; 131b: inner sheath rotation drive member; 132b: inner sheath rotation transmission member; 133b: Inner sheath rotation drive shaft; 13c: open-and-close control assembly; 131c: open-and-close drive member; 132c: open-and-close transmission member; 133c: open-and-close drive shaft; 13d: first control assembly; 131d: first drive member; 132d: first connection rod; 13e: second control assembly; 131e: second drive member; 132e: second connection rod; 13f: locking assembly; 131f: locking drive member; 132f: locking connection rod;
14: first power compartment housing; 15: second power compartment housing; 16: first circuit board; 17: second circuit board;
2: outer sheath adapter;
21: first outer sheath transmission assembly; 211: first outer sheath transmission shaft; 212: outer sheath body driving worm gear; 2121: half-worm gear;
22: second outer sheath transmission assembly; 221: second outer sheath transmission shaft; 2211: outer sheath power input rod; 2212: outer sheath connection rod; 22121: first outer sheath slide rod; 22122: second outer sheath slide rod; 22123: anti-rotation groove; 22124: anti-rotation slider; 2213: outer sheath power output rod; 222: first outer sheath bevel gear; 223: second outer sheath bevel gear; 224: outer sheath transmission worm; 225: outer sheath synchronous belt;
23: outer sheath rotation frame; 231: outer sheath base; 232: outer sheath cover plate;
24: outer sheath mounting frame; 241: outer sheath hanging member; 242: outer sheath mounting groove; 243: hanging retaining wall;
3: middle sheath adapter;
31: first middle sheath driving assembly; 311: first middle sheath bending transmission shaft; 312: first middle sheath transmission worm; 313: first middle sheath bevel gear; 314: second middle sheath bevel gear;
32: second middle sheath driving assembly; 321: second middle sheath bending transmission shaft; 322: second middle sheath transmission worm; 323: third middle sheath bevel gear; 324: fourth middle sheath bevel gear;
33: middle sheath mounting frame; 331: middle sheath support frame; 3311: first middle sheath connection hole; 332: middle sheath base; 333: middle sheath cover plate; 3331: second middle sheath connection hole; 3332: middle sheath positioning member;
34: middle sheath buckle;
4: inner sheath adapter;
41: inner sheath translation transmission unit; 411: inner sheath translation drive rod; 412: translation telescopic assembly; 4121: telescoping portion; 4122: fixed portion; 413: inner sheath translation plate;
42: inner sheath rotation transmission unit; 421: inner sheath rotation transmission shaft; 422: inner sheath rotation gear set; 4221: first inner sheath rotation bevel gear; 4222: second inner sheath rotation bevel gear; 423: rotation gear set shaft; 424: inner sheath rotation bearing;
43: open-and-close transmission unit; 431: open-and-close transmission shaft; 432: open-and-close gear set; 4321: first open-and-close bevel gear; 4322: second open-and-close bevel gear; 4323: bevel gear connection shaft; 4324: first intermediate transmission gear; 4325: double-row gear; 4326: second intermediate transmission gear; 433: open-and-close gear shaft; 434: open-and-close drive gear;
44: first transmission unit; 441: first drive rod; 442: first annular member; 443: first connection rod; 444: first clamping member;
45: second transmission unit; 451: second drive rod; 452: second annular member; 453: second connection rod; 454: second clamping member;
46: locking transmission unit; 461: locking drive rod; 462: locking annular member; 463: locking connection rod; 464: locking clamping member;
47: inner sheath housing.

DETAILED DESCRIPTION

Figure 2:
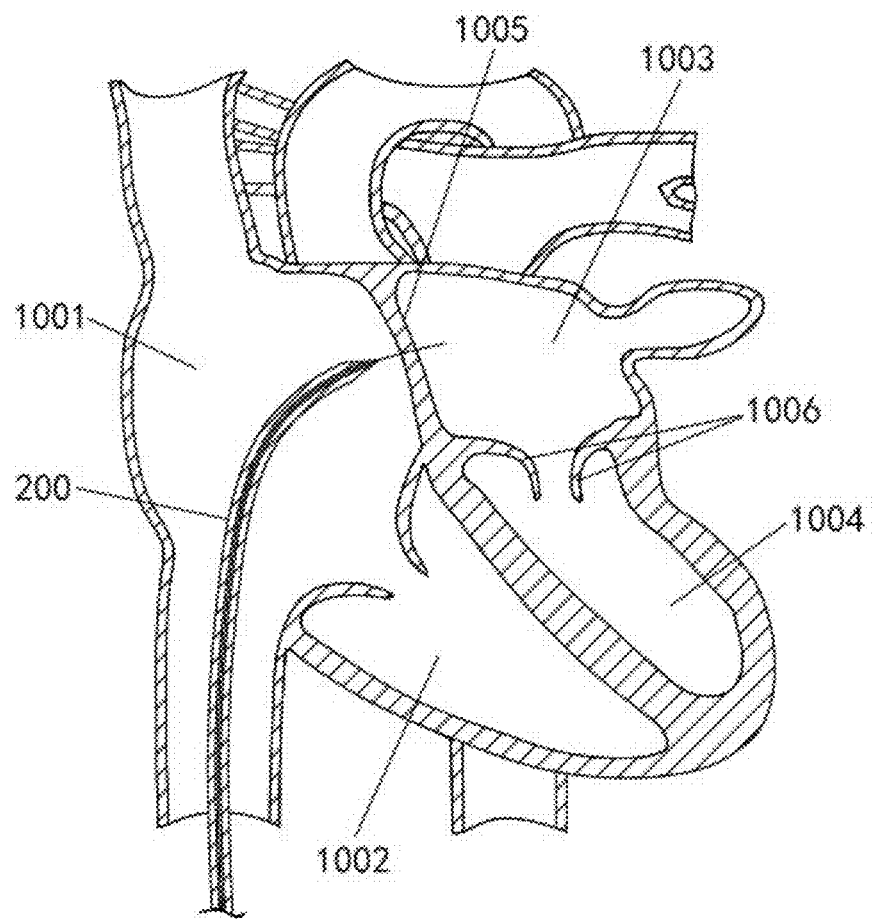
FIG. 2 is a schematic diagram of the heart structure involved in an embodiment of the present disclosure.
Figure 3:
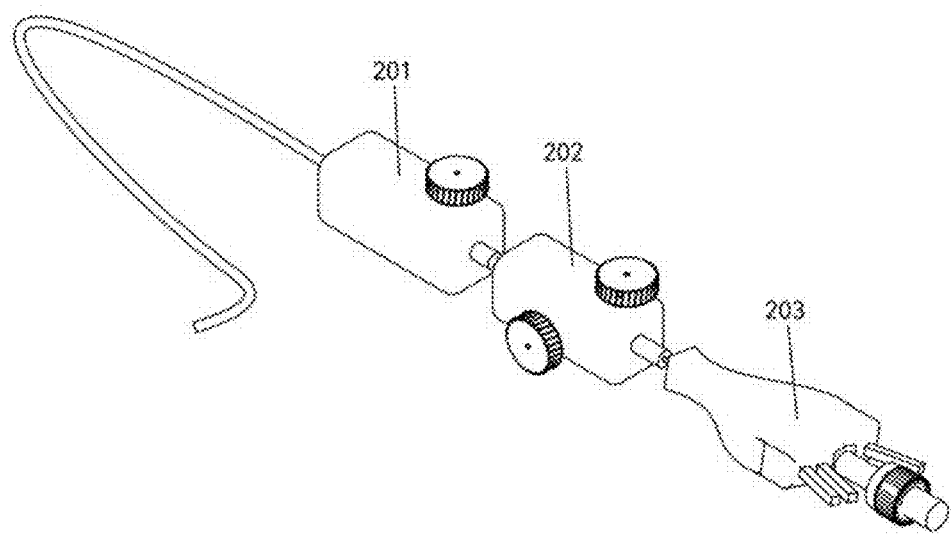
FIG. 3 is a schematic structural diagram of the catheter system according to an embodiment of the present disclosure.

As shown in FIGS. 1 and 2, the mitral valve 1006, a unidirectional "valve" situated between the left atrium 1003 and the left ventricle 1004, can ensure the unidirectional flow of blood from the left atrium 1003 to the left ventricle 1004. The mitral valve 1006 includes anterior and posterior leaflets. During diastole of the left ventricle 1004, both leaflets open to allow blood to flow from the left atrium 1003 to the left ventricle 1004. Conversely, during systole of the left ventricle 1004, the chordae tendineae are stretched, preventing the leaflets from being pushed back into the left atrium by the blood flow. However, in diseased states, the mitral valve 1006 fails to close properly during systole of the left ventricle 1004, as it would in a healthy state, which may cause the leaflets to be pushed back into the left atrium 1003 by the blood flow, leading to regurgitation.

Figure 4:
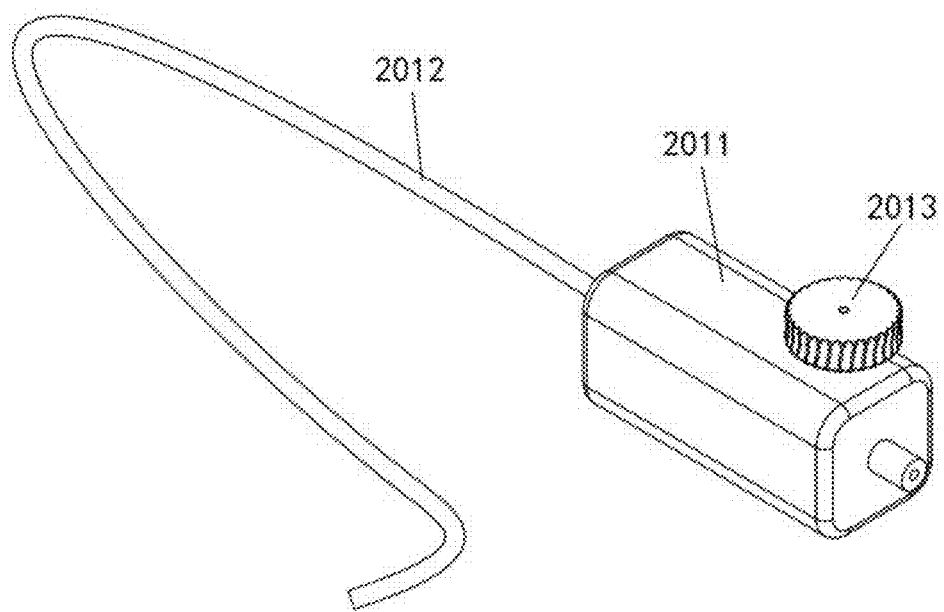
FIG. 4 is a schematic structural diagram of the outer sheath unit according to an embodiment of the present disclosure.

When repairing a diseased mitral valve 1006, the opposite sides of the mitral valve 1006 can be clamped by a mitral valve repair instrument to reduce the distance between the valve leaflets of the mitral valve 1006 and reduce the regurgitation area. The present embodiments use a catheter system 200 as a mitral valve repair instrument. As shown in FIGS. 3 to 6, the catheter system 200 includes an outer sheath unit 201, a middle sheath unit 202, and an inner sheath unit 203. As shown in FIG. 4, the outer sheath unit 201 includes an outer sheath handle 2011 and an outer sheath 2012 connected to the outer sheath handle 2011, with an outer sheath driving gear 2013 being provided on the outer sheath handle 2011. Rotating the outer sheath driving gear 2013 in different directions can cause the outer sheath 2012 to bend in different directions.

Figure 5:
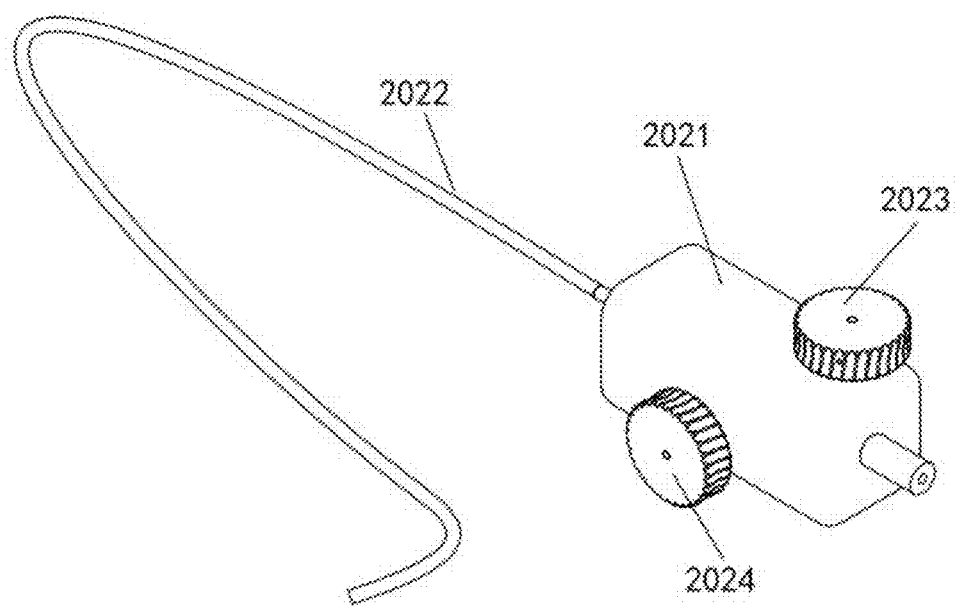
FIG. 5 is a schematic structural diagram of the middle sheath unit according to an embodiment of the present disclosure.
Figure 6:
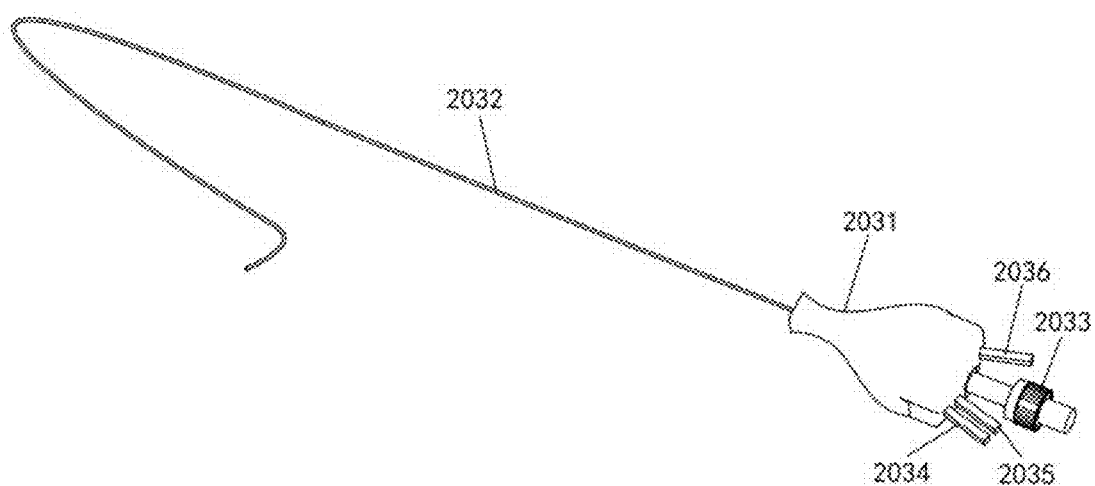
FIG. 6 is a schematic structural diagram of the inner sheath unit according to an embodiment of the present disclosure.

As shown in FIG. 5, the middle sheath unit 202 includes a middle sheath handle 2021 and a middle sheath 2022 connected to the middle sheath handle 2021, with a first middle sheath driving wheel 2023 and a second middle sheath driving wheel 2024 being provided on the middle sheath handle 2021. Rotating the first middle sheath driving wheel 2023 can adjust the bending angle of the distal end of the middle sheath 2022 in a first direction, and rotating the second middle sheath driving wheel 2024 can adjust the bending angle of the distal end of the middle sheath 2022 in a second direction. As shown in FIG. 6, the inner sheath unit 203 includes an inner sheath handle 2031 and an inner sheath 2032 connected to the inner sheath handle 2031, with an inner sheath driving wheel 2033, a first operation lever 2034, a second operation lever 2035 and a locking operation lever 2036 being provided on the inner sheath handle 2031, where the inner sheath driving wheel 2033 is connected to the inner sheath 2032. The outer sheath 2012 is sleeved on the middle sheath 2022, and the middle sheath 2022 is sleeved on the inner sheath 2032, and the outer sheath 2012, the middle sheath 2022 and the inner sheath 2032 can move or rotate relative to each other. Two fixation elements 204 and two clamping elements 205 are provided at one end of the inner sheath 2032 opposite to the inner sheath handle 2031. Rotating the inner sheath driving wheel 2033 in different directions can open or close the fixation elements 204, translating the first operation lever 2034 can open or close one of the clamping elements 205, translating the second operation lever 2035 can open or close the other of the clamping elements 205, and translating the locking operation lever 2036 can lock or unlock the fixation elements 204 and the clamping elements 205.

Figure 7:
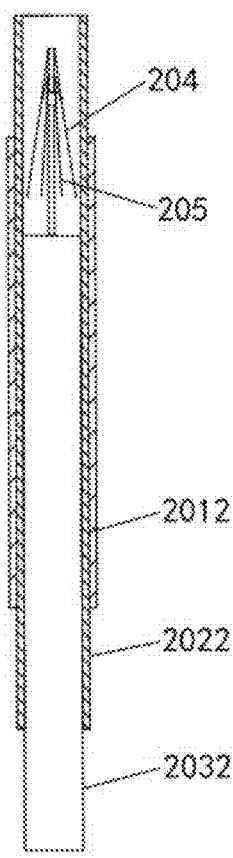
FIG. 7 is a schematic structural diagram of the fixation elements and the clamping elements in the first state according to an embodiment of the present disclosure.
Figure 8:
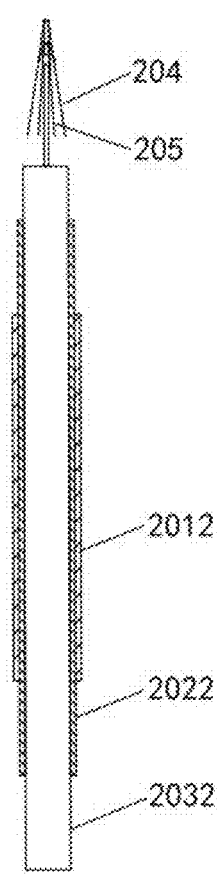
FIG. 8 is a schematic structural diagram of the fixation elements and the clamping elements in the second state according to an embodiment of the present disclosure.
Figure 9:
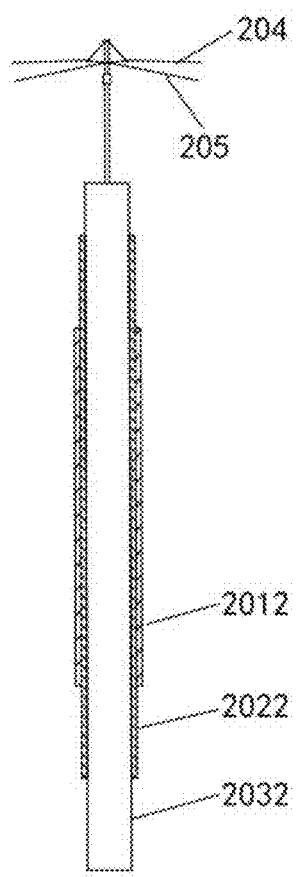
FIG. 9 is a schematic structural diagram of the fixation elements and the clamping elements in the third state according to an embodiment of the present disclosure.
Figure 10:
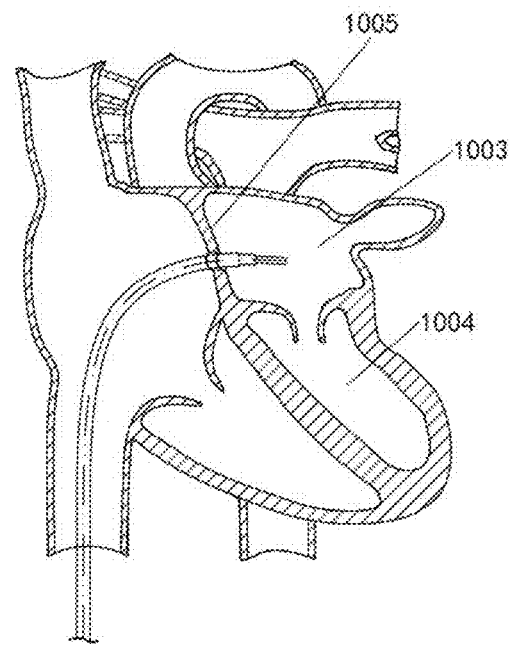
FIG. 10 is a schematic structural diagram of the catheter system introduced into the heart in the first state according to an embodiment of the present disclosure.
Figure 11:
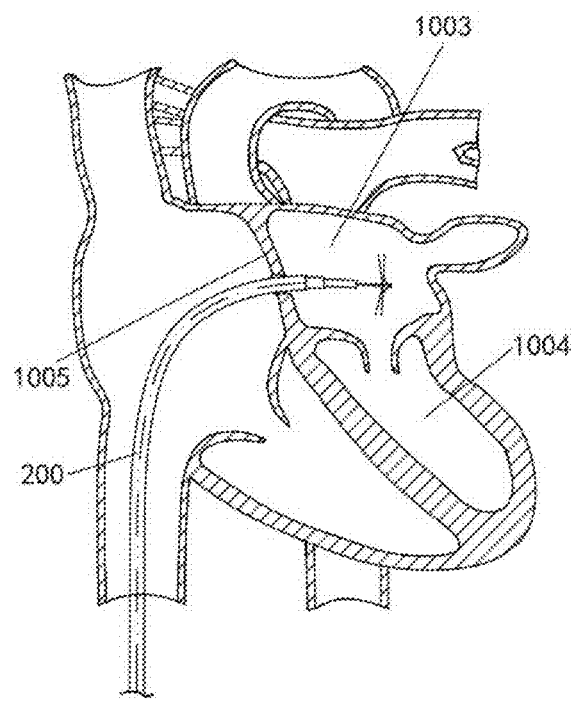
FIG. 11 is a schematic structural diagram of the catheter system introduced into the heart in the second state according to an embodiment of the present disclosure placed in the heart.
Figure 12:
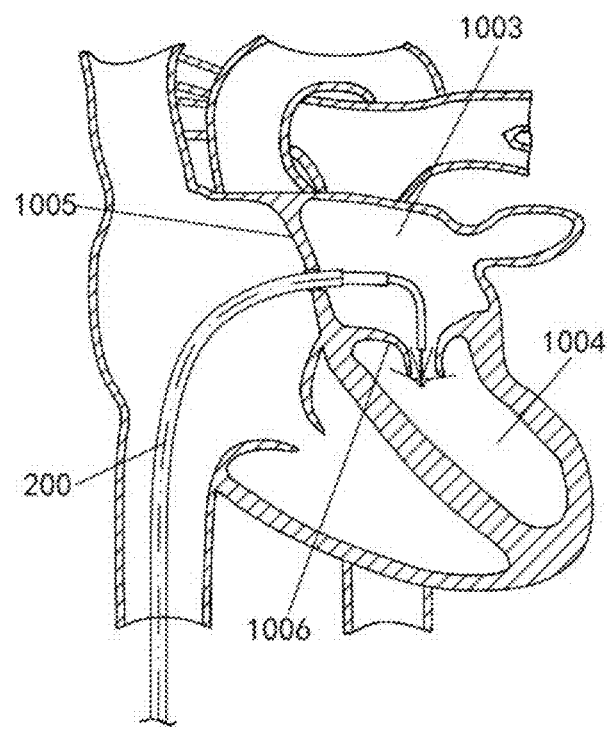
FIG. 12 is a schematic structural diagram of the catheter system introduced into the heart in the third state according to an embodiment of the present disclosure.

FIG. 7 is a schematic diagram of the state in which the fixation elements 204 and the clamping elements 205 are placed inside the middle sheath 2022, FIG. 8 is a schematic diagram of the state in which the inner sheath 2032 moves along the axial direction of the middle sheath 2022 to place the fixation elements 204 and the clamping elements 205 outside the middle sheath 2022, and FIG. 9 is a schematic diagram of the state in which the fixation elements 204 and the clamping elements 205 are open. During the surgical procedure, as shown in FIG. 10, one end of the catheter system 200, equipped with the fixation elements 204 and the clamping elements 205, enters the inferior vena cava via the right femoral vein of the human body, then proceeds to the superior vena cava, and subsequently enters the right atrium 1001. The inner sheath 2032 passes through the atrial septum under the guidance of the middle sheath 2022 and the outer sheath 2012 and enters the left atrium 1003. As shown in FIG. 11, within the left atrium 1003, the fixation elements 204 and the clamping elements 205 are driven to extend out of the middle sheath 2022, and then opened. As shown in FIG. 12, the curvature of the distal end of the inner sheath 2032 is adjusted to guide the fixation elements 204 through the gap between the leaflets of the mitral valve 1006 and into the left ventricle 1004, while the clamping elements 205 are remained in the left atrium 1003. Subsequently, the corresponding operations are performed to repair the mitral valve 1006.

Figure 13:
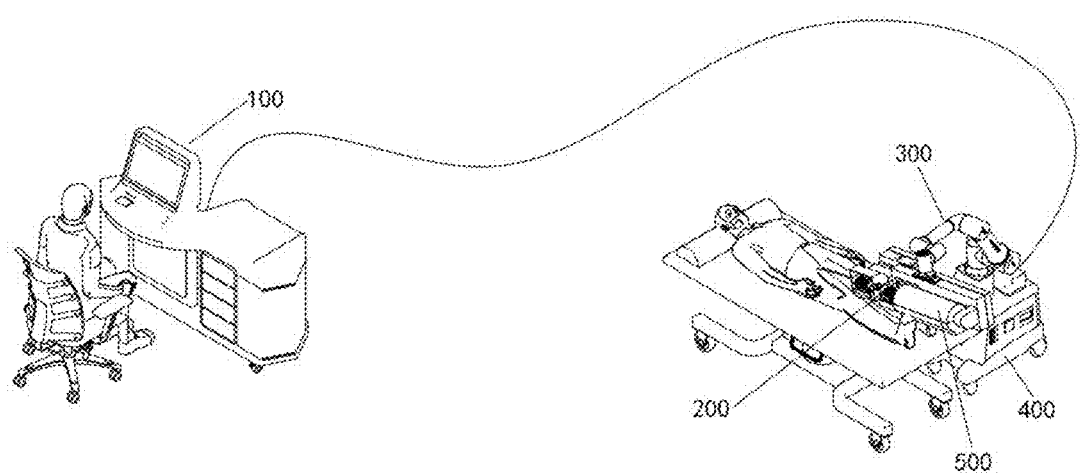
FIG. 13 is a schematic structural diagram of the surgical robot system according to an embodiment of the present disclosure.

For the aforementioned repair procedure, as shown in FIG. 13, this embodiment provides a surgical robot system, which includes a control device 100 and a robotic device that includes a robotic arm 300 and an actuation power apparatus 500 connected to the distal end of the robotic arm 300, where the robotic arm 300 is configured to displace the actuation power apparatus 500. The robotic arm 300 is mounted on a medical cart 400 that is movable so that the position of the robotic arm 300 can be adjusted. The control device 100 is electrically connected to the robotic device and features an operating terminal for controlling the robotic device, which replaces the manual operations of the catheter system 200 by the surgeons, thereby reducing the difficulty of surgical procedure and shortening the surgeons' learning curves, thus enhancing the quality and efficiency of the surgeries. Additionally, while the robotic device is placed in the operating room, the control device 100 can be located outside the operating room to avoid radiation exposure to the surgeons during the procedure.

Figure 14:
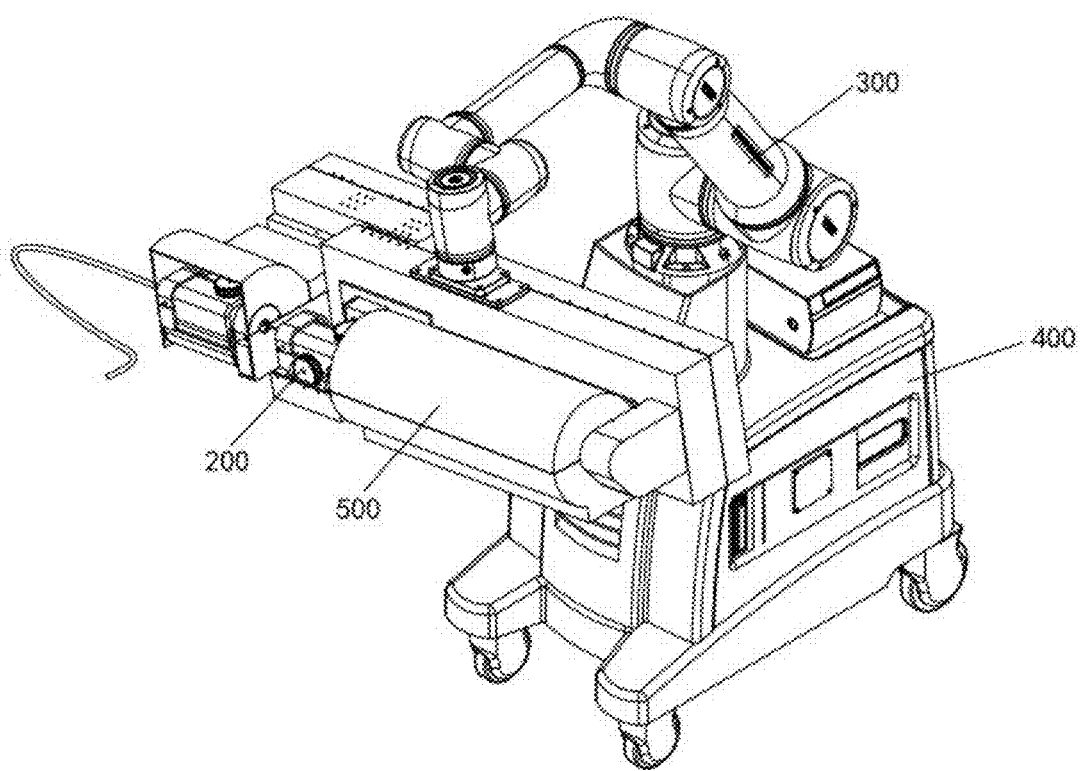
FIG. 14 is a schematic structural diagram of the robotic arm and the actuation power apparatus according to an embodiment of the present disclosure.

As shown in FIG. 14, the actuation power apparatus 500 includes a catheter system driving module and an adapter module, where the adapter module is configured to support the catheter system 200, and the catheter system driving module is configured to drive the adapter module to actuate the catheter system 200. The catheter system driving module actuates the catheter system 200 through the adapter module, and the control device 100 can control the robotic device to displace the actuation power apparatus 500 and actuate the catheter system 200.

Figure 15:
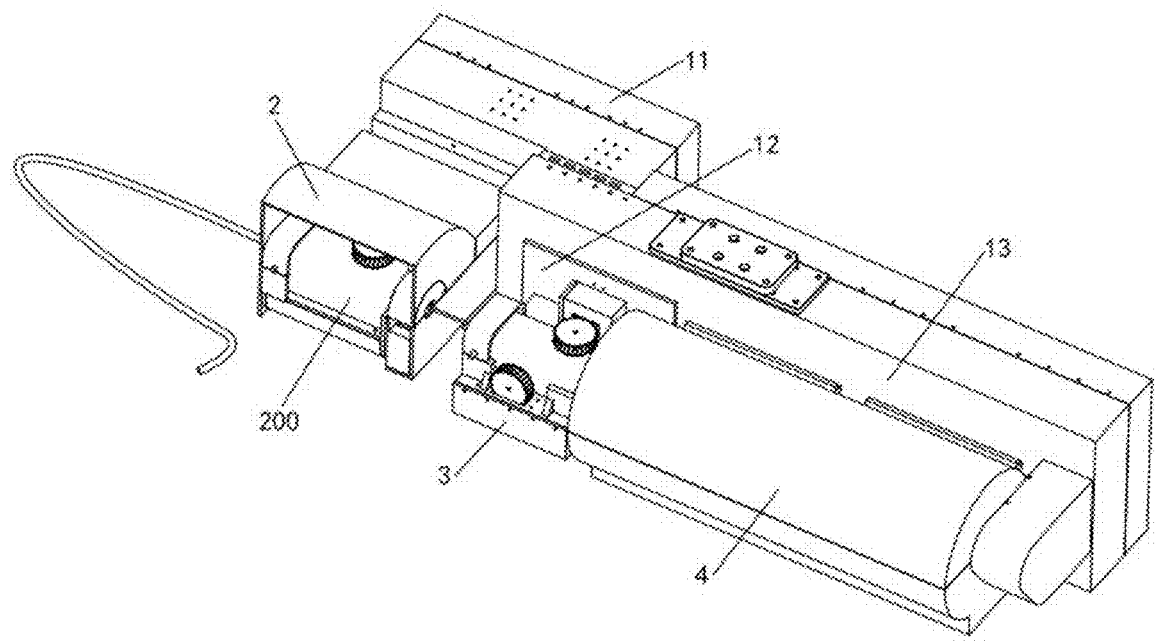
FIG. 15 is a schematic structural diagram of the actuation power apparatus viewed from the first perspective according to an embodiment of the present disclosure.
Figure 16:
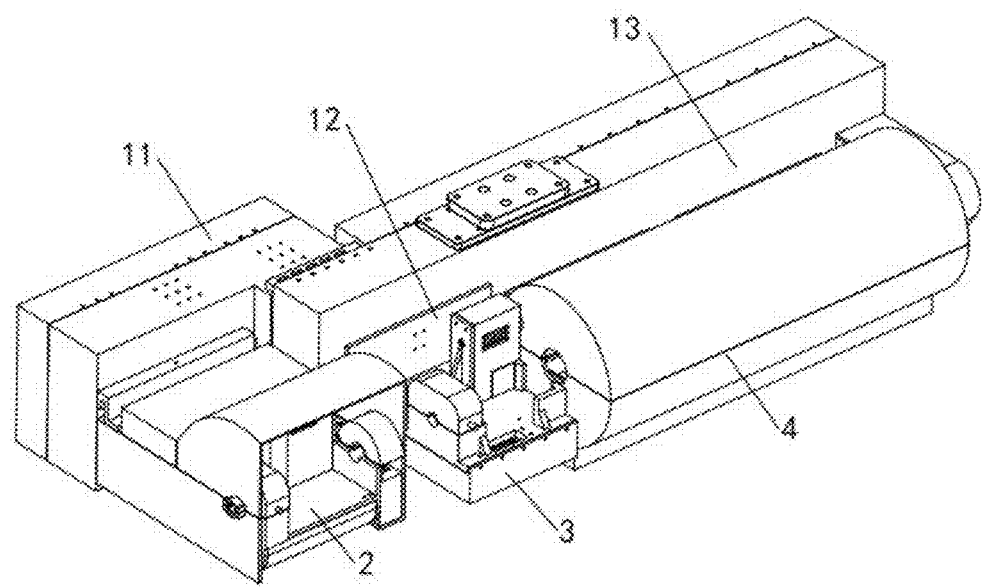
FIG. 16 is a schematic structural diagram of the actuation power apparatus viewed from the second perspective according to an embodiment of the present disclosure.
Figure 17:
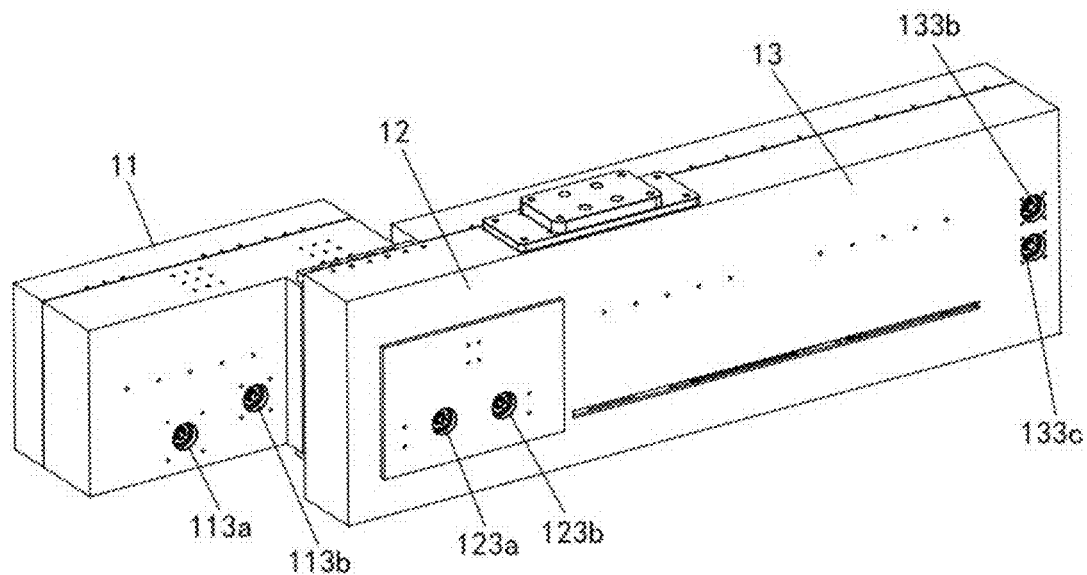
FIG. 17 is a schematic structural diagram of the outer sheath driving unit, the middle sheath driving unit and the inner sheath driving unit according to an embodiment of the present disclosure.

As shown in FIG. 15 and FIG. 16, the catheter system driving module includes an outer sheath driving unit 11, a middle sheath driving unit 12, and an inner sheath driving unit 13, and the adapter module includes an outer sheath adapter 2, a middle sheath adapter 3, and an inner sheath adapter 4. The outer sheath adapter 2 is configured to support the outer sheath unit 201, the middle sheath adapter 3 is configured to support the middle sheath unit 202, and the inner sheath adapter 4 is configured to support the inner sheath unit 203. The outer sheath driving unit 11 drives the outer sheath adapter 2, and is configured to actuate the outer sheath unit 201 through the outer sheath adapter 2. The middle sheath driving unit 12 drives the middle sheath adapter 3, and is configured to actuate the middle sheath unit 202 through the middle sheath adapter 3. The inner sheath driving unit 13 drives the inner sheath adapter 4, and is configured to actuate the inner sheath unit 203 through the inner sheath adapter 4.

Since the outer sheath driving unit 11 actuates the outer sheath unit 201 through the outer sheath adapter 2, the middle sheath driving unit 12 actuates the middle sheath unit 202 through the middle sheath adapter 3, and the inner sheath driving unit 13 actuates the inner sheath unit 203 through the inner sheath adapter 4, the posture and position of the catheter system 200 are adjusted by multiple drive units, thereby achieving semi-automatic control of the catheter system 200 during the surgical procedure, which replaces full manual operations by surgeons, thus reducing the difficulty of surgical procedures, and shortening the learning curves for surgeons.

In this embodiment, as shown in FIGS. 17 to 20, the outer sheath driving unit 11 includes an outer sheath bending drive assembly 11a and an outer sheath rotation drive assembly 11b. The outer sheath bending drive assembly 11a is drivingly connected to the second outer sheath transmission shaft 221 of the outer sheath adapter 2, and is configured to adjust the bending of the distal end of the outer sheath 2012. The outer sheath rotation drive assembly 11b is drivingly connected to the first outer sheath transmission shaft 211 of the outer sheath adapter 2, and is configured to drive the outer sheath unit 201 to rotate around its own axis. By configuring the outer sheath bending drive assembly 11a and the outer sheath rotation drive assembly 11b, the bending of the distal end of the outer sheath 2012 and its rotation can be achieved.

Figure 19:
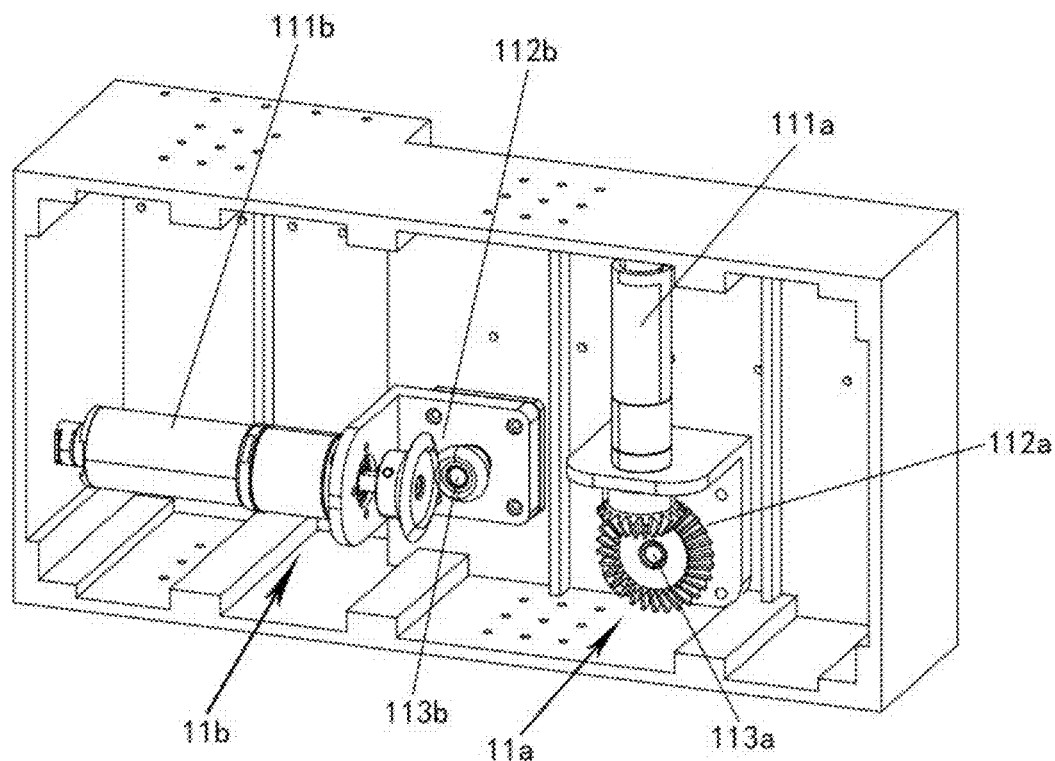
FIG. 19 is the second schematic diagram of the internal structure of the outer sheath driving unit according to an embodiment of the present disclosure.
Figure 20:
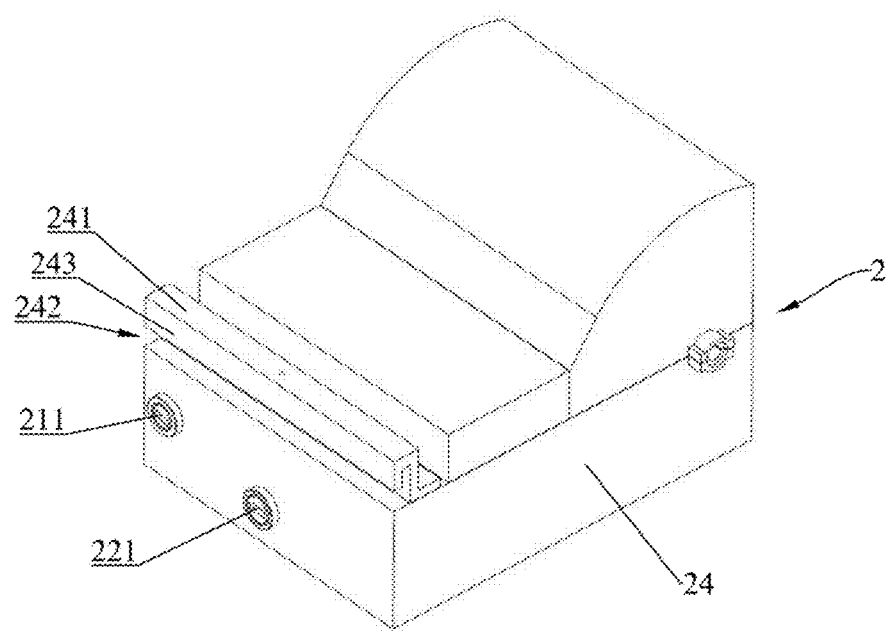
FIG. 20 is a schematic structural diagram of the outer sheath adapter viewed from the first perspective according to an embodiment of the present disclosure.
Figure 21:
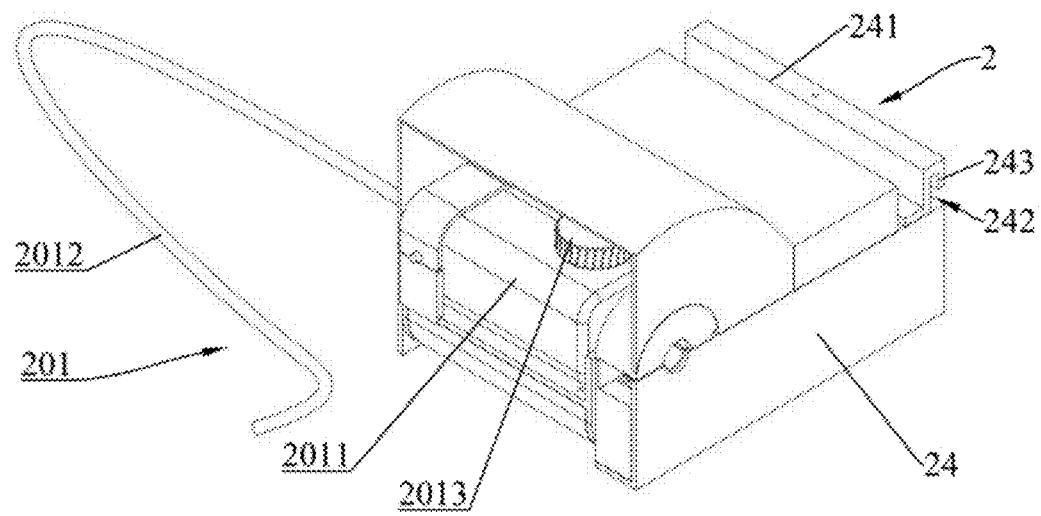
FIG. 21 is a schematic structural diagram of the outer sheath adapter with the outer sheath unit installed thereon according to an embodiment of the present disclosure.

In one embodiment, as shown in FIGS. 19 and 20, the outer sheath bending drive assembly 11a includes an outer sheath bending drive member 111a, an outer sheath bending transmission member 112a, and an outer sheath bending drive shaft 113a. The outer sheath bending drive member 111a is drivingly connected to the input end of the outer sheath bending transmission member 112a. The outer sheath bending drive shaft 113a has a first end connected to the output end of the outer sheath bending transmission member 112a and a second end connected to the second outer sheath transmission shaft 221 of the outer sheath adapter 2. This configuration achieves a simplified structure for the outer sheath bending drive assembly 11a.

The outer sheath bending drive member 111a is a motor, and the outer sheath bending transmission member 112a includes a first outer sheath bending bevel gear and a second outer sheath bending bevel gear, where the first outer sheath bending bevel gear is connected to the output shaft of the motor, and the second outer sheath bending bevel gear is connected to the outer sheath bending drive shaft 113a and meshed with the first outer sheath bending bevel gear. This configuration enables the outer sheath bending transmission member 112a to change the transmission direction of the motor power.

The outer sheath rotation drive assembly 11b includes an outer sheath rotation drive member 111b, an outer sheath rotation transmission member 112b and an outer sheath rotation drive shaft 113b. The outer sheath rotation drive member 111b is drivingly connected to the input end of the outer sheath rotation transmission member 112b. The outer sheath rotation drive shaft 113b has a first end connected to the output end of the outer sheath rotation transmission member 112b and a second end connected to the first outer sheath driving shaft 211. This configuration achieves a simplified structure for the outer sheath rotation drive assembly 11b.

The outer sheath rotation drive member 111b is a motor, and the outer sheath rotation transmission member 112b includes a first outer sheath rotation bevel gear and a second outer sheath rotation bevel gear, where the first outer sheath rotation bevel gear is connected to the output shaft of the motor, and the second outer sheath rotation bevel gear is connected to the outer sheath rotation drive shaft 113b and is meshed with the first outer sheath rotation bevel gear. This configuration enables the outer sheath rotation transmission member 112b to change the transmission direction of the motor power, thus allowing for a compact structure.

Figure 18:
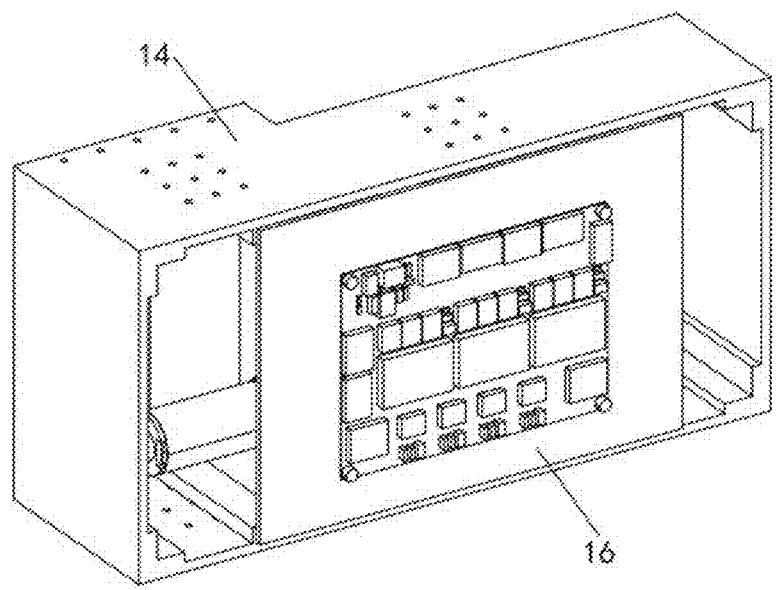
FIG. 18 is the first schematic diagram of the internal structure of the outer sheath driving unit according to an embodiment of the present disclosure.

As shown in FIG. 18, the outer sheath driving unit 11 further includes a first power compartment housing 14 with the outer sheath bending drive assembly 11a and the outer sheath rotation drive assembly 11b being installed therein, where a first circuit board 16 is further provided within the first power compartment housing 14 and configured to control the outer sheath bending drive assembly 11a and the outer sheath rotation drive assembly 11b.

As shown in FIGS. 20 to 24, the outer sheath adapter 2 includes an outer sheath rotation frame 23, a first outer sheath transmission assembly 21, and a second outer sheath transmission assembly 22. The outer sheath handle 2011 is mounted on the outer sheath rotation frame 23, with its axial direction coinciding with the rotation axis of the outer sheath rotation frame 23. The first outer sheath transmission assembly 21 includes a first outer sheath transmission shaft 211 in transmission connection to the outer sheath rotation frame 23 to drive the outer sheath rotation frame 23 to rotate. The second outer sheath transmission assembly 22 includes a second outer sheath transmission shaft 221 having one end being in transmission connection to the outer sheath driving gear 2013 to drive the outer sheath driving gear 2013 to rotate.

In the outer sheath adapter 2, the second outer sheath transmission assembly 22 can drive the outer sheath driving gear 2013 to rotate via the second outer sheath transmission shaft 221, thereby driving the outer sheath 2012 to bend. After the outer sheath 2012 is bent, the outer sheath rotation frame 23 is driven to rotate by the first outer sheath transmission assembly 21 through the first outer sheath transmission shaft 211, which in turn drives the outer sheath handle 2011 to rotate. By rotation of the outer sheath handle 2011, the bending direction of the outer sheath 2012 can be adjusted so that the outer sheath 2012 orients its distal end towards the atrial septum 1005, ensuring that the outer sheath 2012 can smoothly enter the left atrium 1003 and successfully deliver the valve repair instrument to the mitral valve 1006.

The second outer sheath transmission shaft 221 is connected to the outer sheath bending drive shaft 113a of the outer sheath bending drive assembly 11a. The first outer sheath transmission shaft 211 is connected to the outer sheath rotation drive shaft 113b of the outer sheath rotation drive assembly 11b.

The outer sheath adapter 2 enables remote control of the outer sheath 2012, which not only improves the working environment for surgeons, but also enhances the stability and accuracy of surgical procedures, thus reducing the difficulty of the procedure and shortening the learning curves for surgeons to master complex surgical procedures.

Figure 22:
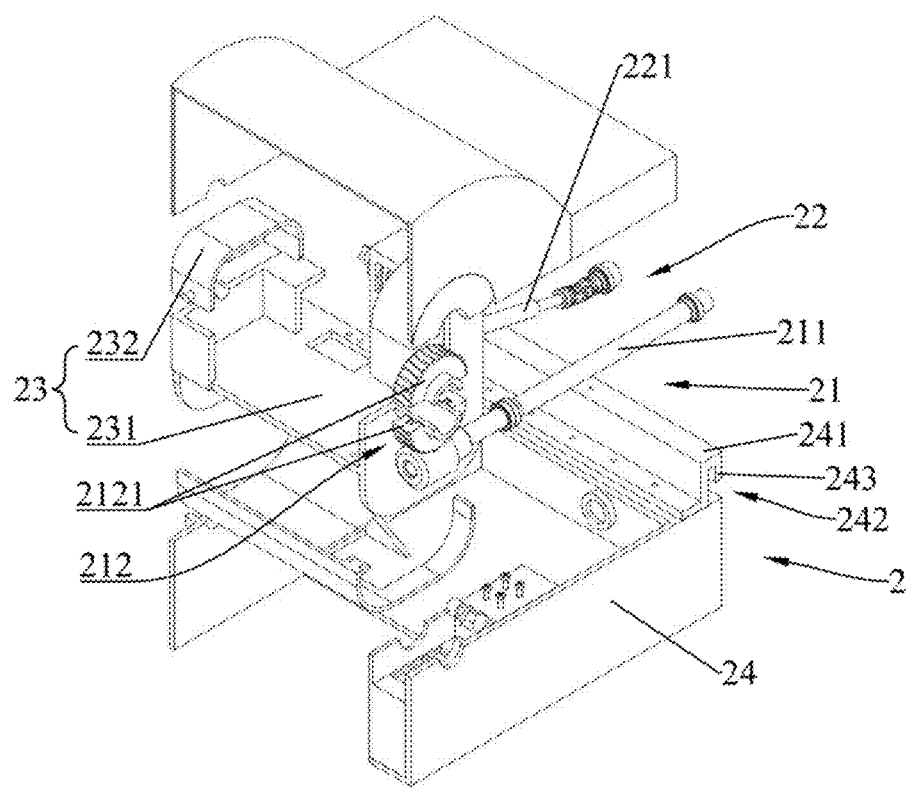
FIG. 22 is a first schematic structural diagram of the outer sheath adapter in an exploded state according to an embodiment of the present disclosure.
Figure 23:
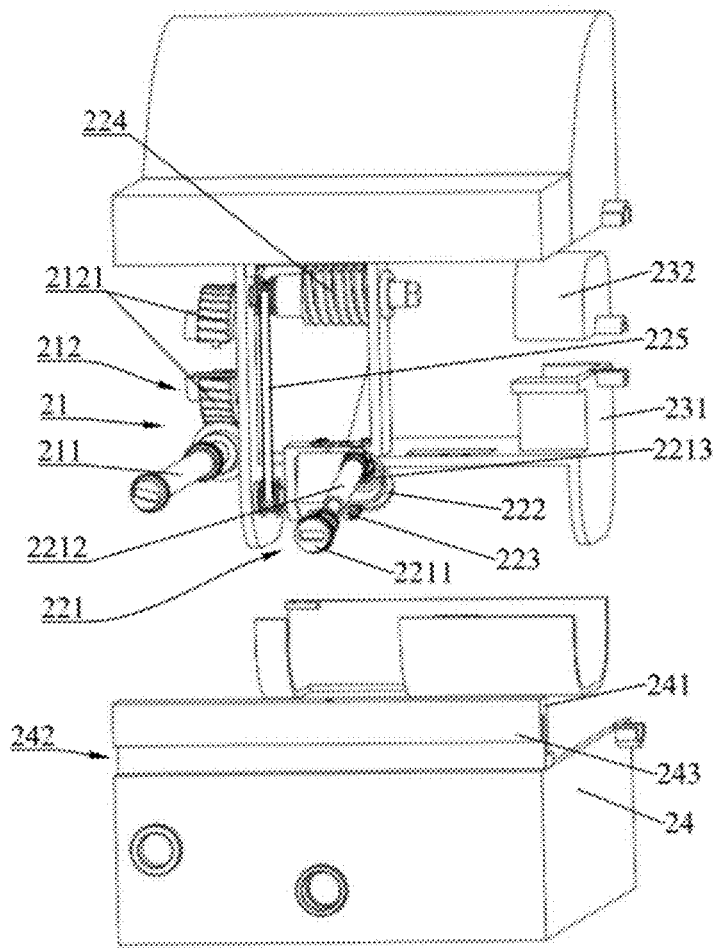
FIG. 23 is a second schematic structural diagram of the outer sheath adapter in an exploded state according to an embodiment of the present disclosure.

As shown in FIGS. 22 and 23, the first outer sheath transmission assembly 21 further includes an outer sheath body driving worm gear 212, and the first outer sheath transmission shaft 211 is a worm, where the outer sheath body driving worm gear 212 is fixedly connected to the outer sheath rotation frame 23, and the first outer sheath transmission shaft 211 is meshed with the outer sheath body driving worm gear 212. The worm gear transmission structure utilized for driving the rotation of the outer sheath rotation frame 23 can not only change the transmission direction, allowing optimized relative positioning between the outer sheath handle 2011 and the first outer sheath transmission shaft 211, but also function as a speed reduction mechanism, which significantly reduces the rotation speed of the outer sheath rotation frame 23 compared to that of the first outer sheath transmission shaft 211, thereby enabling smoother and more stable rotation of the outer sheath rotation frame 23, and facilitating precise control over the rotation angle of the outer sheath rotation frame 23, thus enhancing the safety of surgical procedures.

As shown in FIGS. 22 and 23, the outer sheath rotation frame 23 includes an outer sheath base 231 and an outer sheath cover plate 232 that are detachably connected, for the outer sheath handle 2011 to be fixedly mounted therebetween. The outer sheath cover plate 232 and the outer sheath base 231 allows for secure fixation of the outer sheath handle 2011, and also facilitates its removal and installation, thereby enhancing the efficiency of preoperative preparation.

The catheter system 200 of the present embodiment includes an outer sheath unit 201, a middle sheath unit 202 and an inner sheath unit 203, where the outer, middle and inner sheaths 2012, 2022 and 2032 are nested, hence the outer sheath unit 201 need to be secured at its both ends. To this end, the outer sheath body driving worm gear 212 includes two detachably connected half-worm gears 2121 which can interlock to form a complete outer sheath body driving worm gear 212, for arranging the outer sheath handle 2011 therebetween.

In one embodiment, the second outer sheath transmission assembly further includes a first outer sheath bevel gear 222, a second outer sheath bevel gear 223 and an outer sheath transmission worm 224, where the first and second outer sheath bevel gears 222 and 223 each are rotatably mounted on the outer sheath rotation frame 23. The first outer sheath bevel gear 222 is in transmission connection to the second outer sheath transmission shaft 221, the second outer sheath bevel gear 223 is in transmission connection to the outer sheath transmission worm 224. The outer sheath driving gear 2013 is a worm gear, and the outer sheath transmission worm 224 is meshed with the outer sheath driving gear 2013.

The second outer sheath transmission shaft 221 can drive the outer sheath transmission worm 224 to rotate through the first and second outer sheath bevel gears 222 and 223, which in turn drives the outer sheath driving gear 2013 to rotate, thereby adjusting the bending direction and degree of the outer sheath 2012. The transmission engagement between the first outer sheath bevel gear 222, the second outer sheath bevel gear 223 and the outer sheath transmission worm 224, allows for flexible positioning of the second outer sheath transmission shaft 221, especially in this embodiment, allows the second outer sheath transmission shaft 221 to be installed closer to the first outer sheath transmission shaft 211, thereby achieving a more compact structure that saves space.

In one embodiment, the second outer sheath transmission assembly 22 further includes an outer sheath synchronous belt 225 that is wound around the second outer sheath bevel gear 223 and the outer sheath transmission worm 224 at its opposite ends to cause the second outer sheath bevel gear 223 and the outer sheath transmission worm 224 to rotate synchronously. The outer sheath synchronous belt 225 is tensioned between the second outer sheath bevel gear 223 and the outer sheath transmission worm 224, ensuring their synchronous rotation. Moreover, the outer sheath synchronous belt 225 can not only reduce the assembly precision requirements for the second outer sheath bevel gear 223 and the outer sheath transmission worm 224, but also ensure the transmission accuracy at a low cost.

As shown in FIG. 23, when the outer sheath rotation frame 23 rotates under the drive of the first outer sheath transmission shaft 211, a change in the angle between the first outer sheath bevel gear 222 and the second outer sheath transmission shaft 221 may be caused. To ensure unrestricted rotation of the outer sheath rotation frame 23, the second outer sheath transmission shaft 221 includes an outer sheath power input rod 2211, an outer sheath connection rod 2212 and an outer sheath power output rod 2213, with respective universal joints being connected between the outer sheath power input rod 2211 and the outer sheath connection rod 2212, and between the outer sheath connection rod 2212 and the outer sheath power output rod 2213, where the first outer sheath bevel gear 222 is arranged on the outer sheath power output rod 2213.

In one embodiment, the axial direction of the outer sheath power input rod 2211 remains constant to ensure stable connection with the device that drives its rotation. When the outer sheath rotation frame 23 rotates, the outer sheath connection rod 2212 also moves. However, the universal joints allow for changes in angles between the outer sheath connection rod 2212 and the outer sheath power input rod 2211 and between the outer sheath power input rod 2211 and the outer sheath power output rod 2213, while ensuring synchronous rotations of the outer sheath connection rod 2212, the outer sheath power input rod 2211 and the outer sheath power output rod 2213 along their respective axes, thereby ensuring uninterrupted power transmission.

Figure 24:
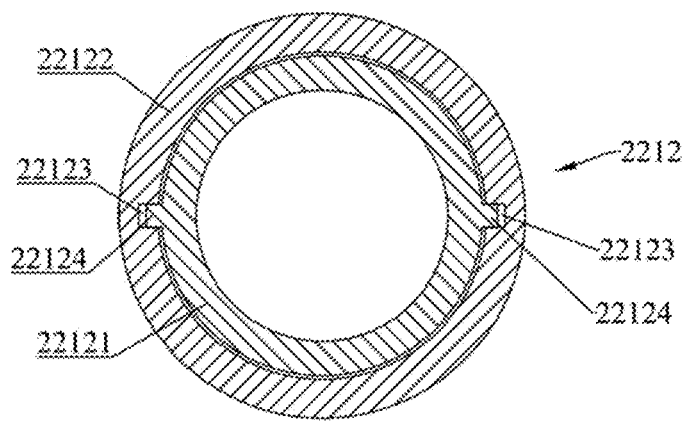
FIG. 24 is a schematic structural diagram of the outer sheath connection rod according to an embodiment of the present disclosure.

As shown in FIG. 24, the outer sheath connection rod 2212 includes a first outer sheath slide rod 22121 and a second outer sheath slide rod 22122 that can slide relative to each other along their respective axes, where the second outer sheath slide rod 22122 is sleeved over the first outer sheath slide rod 22121. When the outer sheath rotation frame 23 rotates, not only do the angles between the outer sheath connection rod 2212 and the outer sheath power input rod 2211 and between the outer sheath connection rod 2212 and the outer sheath power output rod 2213 change, but also the distance between the opposite ends of the outer sheath connection rod 2212 varies. However, the first and second outer sheath slide rods 22121 and 22122 that can slide relative to each other allows the outer sheath connection rod 2212 to extend or retract as the outer sheath rotation frame 23 rotates, thereby preventing the outer sheath connection rod 2212 from breaking or restricting the rotation of the outer sheath rotation frame 23.

In order to prevent relative rotation between the first and second outer sheath slide rods 22121 and 22122, which interferes with the power transmission, the second outer sheath slide rod 22122 has an inner wall provided with an anti-rotation groove 22123 extending along the axial direction, and the first outer sheath slide rod 22121 has an outer wall provided with an anti-rotation slider 22124 that is slidably engaged within the anti-rotation groove 22123. The engagement between the anti-rotation slider 22124 and the anti-rotation groove 22123 can not only guide the sliding motion between the first and second outer sheath slide rods 22121 and 22122, but also prevent relative rotation therebetween.

In one embodiment, the first outer sheath slide rod 22121 is provided with a plurality of anti-rotation sliders 22124 protruding from its outer wall, and the second outer sheath slide rod 22122 is provided with a plurality of anti-rotation grooves 22123 formed in its inner wall to extend along the axial direction. When the outer sheath power input rod 2211 rotates, the engagement of the anti-rotation sliders 22124 with the anti-rotation grooves 22123 causes the first outer sheath slide rod 22121 to drive the second outer sheath slide rod 22122 to rotate, where the plurality of anti-rotation sliders 22124 can distribute the force evenly, thereby reducing the load on each anti-rotation slider 22124 and thus extending their service lives.

In this embodiment, the first outer sheath slide rod 22121 is provided with two anti-rotation sliders 22124 that protrude from its outer wall and face opposite directions, and the second outer sheath slide rod 22122 is provided with two anti-rotation grooves 22123 formed in its inner wall to extend in the axial direction.

As shown in FIGS. 20 to 23, the outer sheath adapter 2 further includes an outer sheath mounting frame 24, with the first outer sheath transmission shaft 211, the second outer sheath transmission shaft 221 and the outer sheath rotation frame 23 being rotatably mounted on the outer sheath mounting frame 24, where the outer sheath mounting frame 24 is provided with an outer sheath hanging member 241, with an outer sheath mounting groove 242 being formed between the outer sheath hanging member 241 and the outer sheath mounting frame 24. In the second outer sheath transmission shaft 221, the structure rotatably connected to the outer sheath mounting frame 24 is the outer sheath power input rod 2211. The outer sheath adapter 2 is fixed to the actuation power apparatus 500 through the outer sheath mounting frame 24.

In one embodiment, the actuation power apparatus 500 is provided with a mounting protrusion for being inserted into the outer sheath mounting groove 242 to fixedly connect the outer sheath adapter 2 to the actuation power apparatus 500. To install the outer sheath adapter 2 onto the actuation power apparatus 500, it is only necessary to slide the mounting protrusion into the outer sheath mounting groove 242 from one side.

In one embodiment, a portion of the outer sheath hanging member 241, located at the notch of the outer sheath mounting groove 242, extends downward to form a hanging retaining wall 243, making the outer sheath mounting groove 242 L-shaped, and the mounting protrusion is also L-shaped. Therefore, when the mounting protrusion slides into the outer sheath mounting groove 242, the outer sheath adapter 2 can be firmly secured to the actuation power apparatus 500 under the constraint of the hanging retaining wall 243 and the outer sheath mounting frame 24.

As shown in FIGS. 25 to 28, the middle sheath driving unit 12 includes a first middle sheath bending drive assembly 12a and a second middle sheath bending drive assembly 12b. The first middle sheath bending drive assembly 12a is drivingly connected to the first middle sheath bending transmission shaft 311 of the middle sheath adapter 3 to adjust the bending angle of the distal end of the middle sheath 2022 of the middle sheath unit 202 in the first direction. The second middle sheath bending drive assembly 12b is drivingly connected to the second middle sheath bending transmission shaft 321 of the middle sheath adapter 3 to adjust the bending angle of the distal end of the middle sheath 2022 in the second direction. The first and second middle sheath bending drive assemblies 12a and 12b can adjust the bending angles of the distal end of the middle sheath 2022 in different directions. In this embodiment, the first direction is the horizontal direction and the second direction is the vertical direction, which meets the requirements for surgical procedures.

Figure 26:
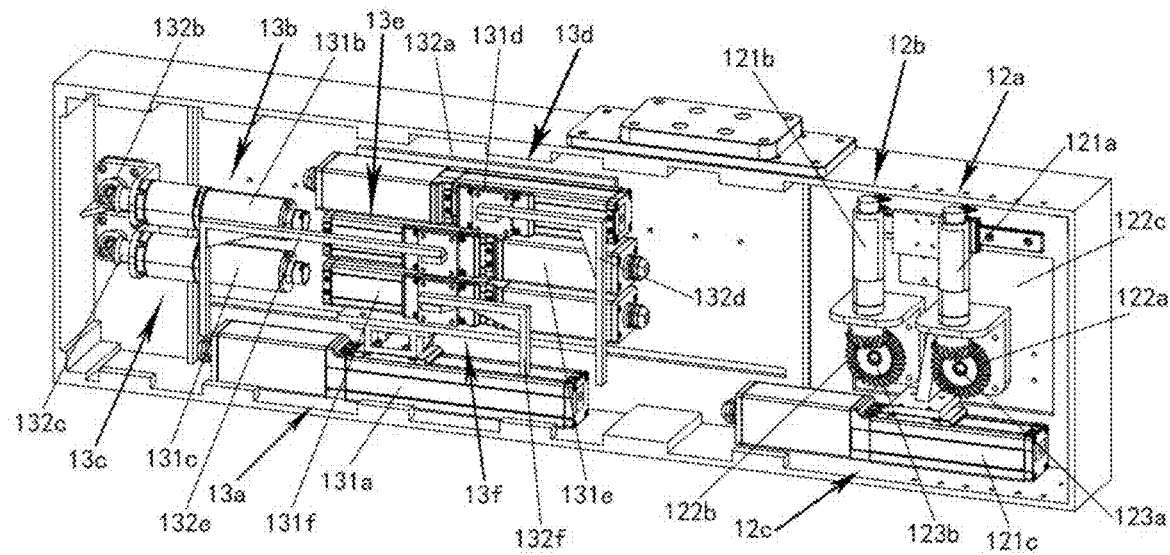
FIG. 26 is a second schematic diagram of the internal structure of the middle sheath driving unit and the inner sheath driving unit according to an embodiment of the present disclosure.
Figure 28:
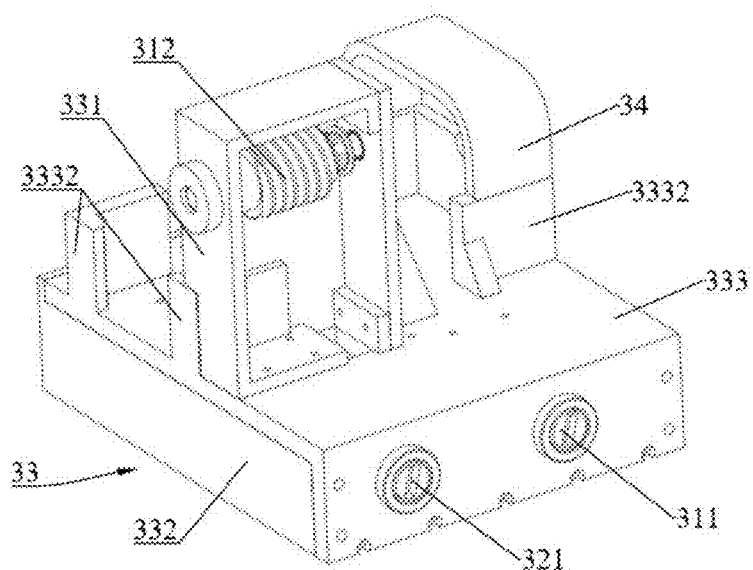
FIG. 28 is a schematic structural diagram of the middle sheath adapter viewed from the first perspective according to an embodiment of the present disclosure.
Figure 29:
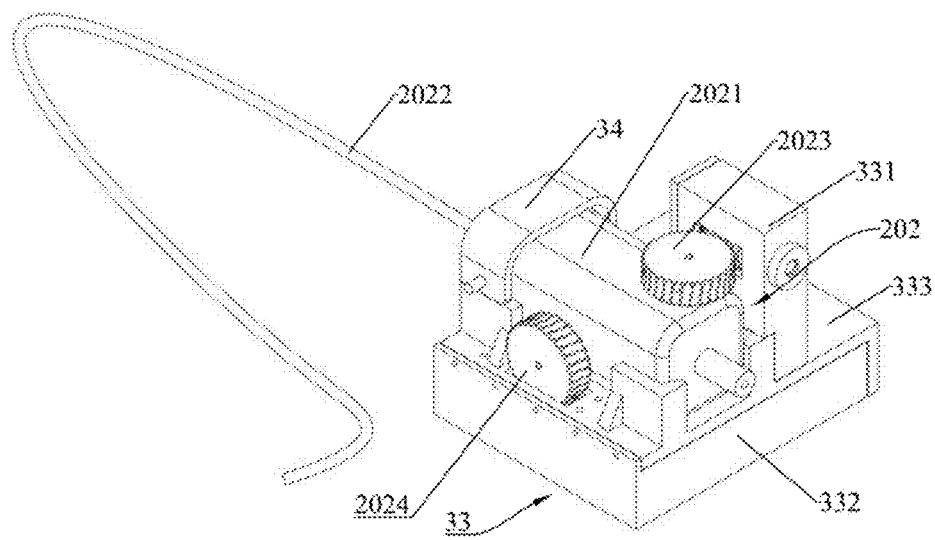
FIG. 29 is a schematic structural diagram of the middle sheath adapter with the middle sheath unit installed thereon according to an embodiment of the present disclosure.
Figure 30:
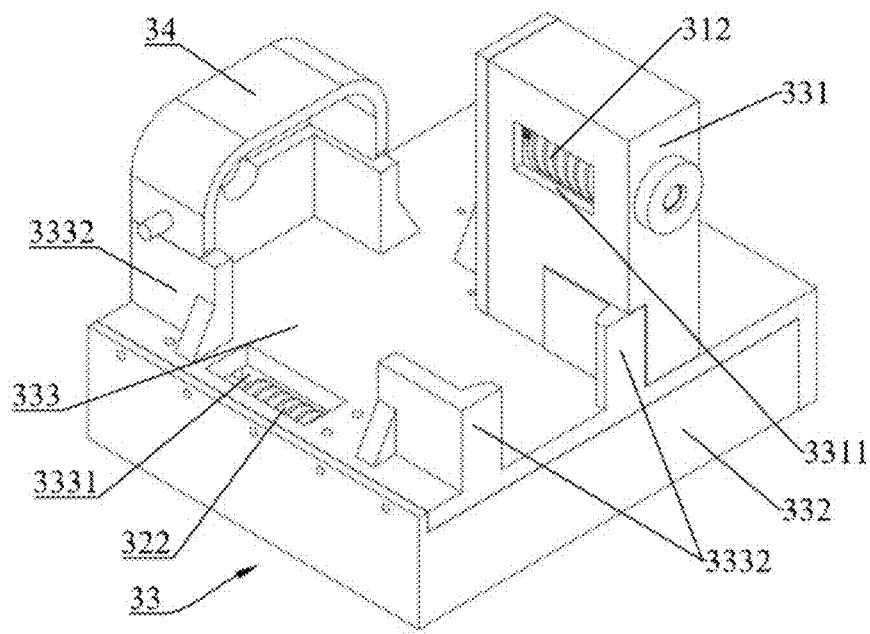
FIG. 30 is a schematic structural diagram of the middle sheath adapter viewed from a second perspective according to an embodiment of the present disclosure.
Figure 31:
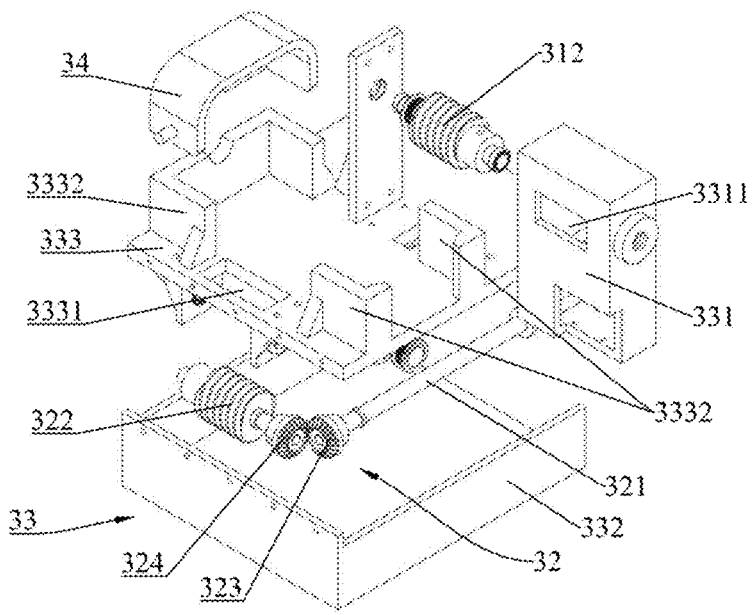
FIG. 31 is a first schematic structural diagram of the middle sheath adapter in an exploded state according to an embodiment of the present disclosure.
Figure 32:
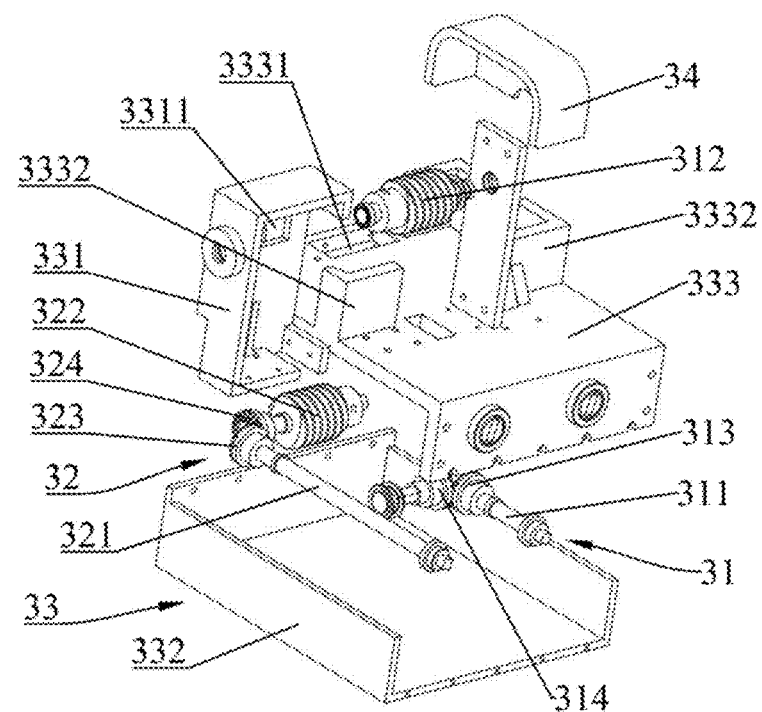
FIG. 32 is a second schematic structural diagram of the middle sheath adapter in an exploded state according to an embodiment of the present disclosure.

In one embodiment, as shown in FIGS. 26 and 28, the first middle sheath bending drive assembly 12a includes a first middle sheath bending drive member 121a, a first middle sheath bending transmission member 122a and a first middle sheath bending drive shaft 123a. The first middle sheath bending drive member 121a is drivingly connected to the input end of first middle sheath bending transmission member 122a. The first middle sheath bending drive shaft 123a has a first end connected to the output end of the first middle sheath bending transmission member 122a and a second end connected to the first middle sheath bending transmission shaft 311.

The first middle sheath bending drive member 121a is a motor, and the first middle sheath bending transmission member 122a includes a first middle sheath bending bevel gear and a second middle sheath bending bevel gear, where the first middle sheath bending bevel gear is connected to the output shaft of the motor, and the second middle sheath bending bevel gear is connected to the first middle sheath bending drive shaft 123a, and the first and second middle sheath bending bevel gears are meshed with each other. The configuration enables the first middle sheath bending drive member 121a to change the transmission direction of the motor power, thus allowing for a compact structure.

The second middle sheath bending drive assembly 12b includes a second middle sheath bending drive member 121b, a second middle sheath bending transmission member 122b, and a second middle sheath bending drive shaft 123b. The second middle sheath bending drive member 121b is drivingly connected to the input end of the second middle sheath bending transmission member 122b, the second middle sheath bending drive shaft 123b has a first end connected to the output end of the second middle sheath bending transmission member 122b and a second end connected to the second middle sheath bending transmission shaft 321.

The second middle sheath bending drive member 121b is a motor, and the second middle sheath bending transmission member 122b includes a third sheath bending bevel gear and a fourth sheath bending bevel gear, where the third sheath bending bevel gear is connected to the output shaft of the motor, the fourth sheath bending bevel gear is connected to the second middle sheath bending drive shaft 123b, and the third and fourth sheath bending bevel gears are meshed with each other. The configuration enables the second middle sheath bending transmission member 122b to change the transmission direction of the motor power, thus allowing for a compact structure.

Figure 27:
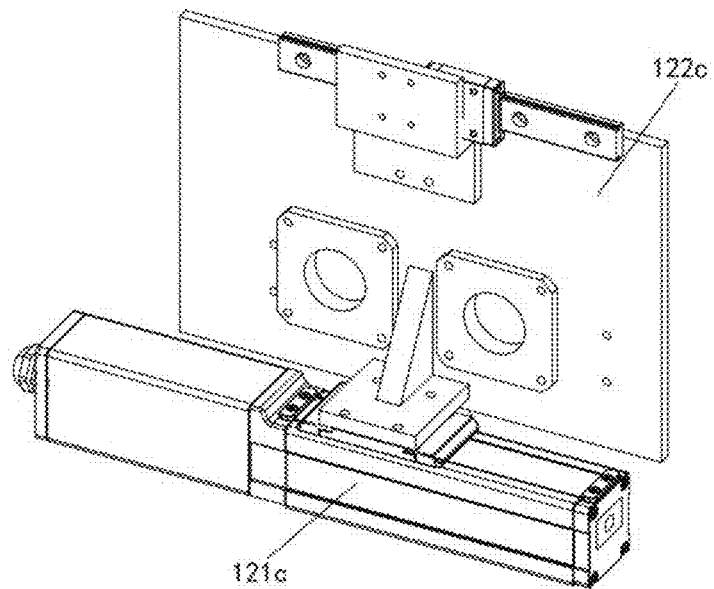
FIG. 27 is a schematic structural diagram of the middle sheath translation drive assembly according to an embodiment of the present disclosure.

In some other embodiments, as shown in FIGS. 26 and 27, the middle sheath driving unit 12 further includes a middle sheath translation drive assembly 12c that is drivingly connected to the middle sheath adapter 3 and configured to drive the middle sheath unit 202 to move axially.

In one embodiment, the middle sheath translation drive assembly 12c includes a middle sheath translation drive member 121c and a middle sheath translation mounting plate 122c, where the middle sheath translation drive member 121c has an output end drivingly connected to the middle sheath translation mounting plate 122c, and the middle sheath adapter 3 is connected to the middle sheath translation mounting plate 122c so that the middle sheath handle 2021 mounted on the middle sheath adapter 3 to move horizontally. The first and second middle sheath bending drive assemblies 12a and 12b are mounted on the middle sheath translation mounting plate 122c to accommodate the horizontal movement of the middle sheath adapter 3. When the middle sheath adapter 3 moves horizontally, the first and second middle sheath bending drive assemblies 12a and 12b can be effectively connected to the middle sheath adapter 3 to facilitate the adjustment of the bending angles of the distal end of the middle sheath 2022 in the first and second directions.

The middle sheath translation drive member 121c is an electric cylinder, with its moving block connected to the middle sheath translation mounting plate 122c.

Figure 25:
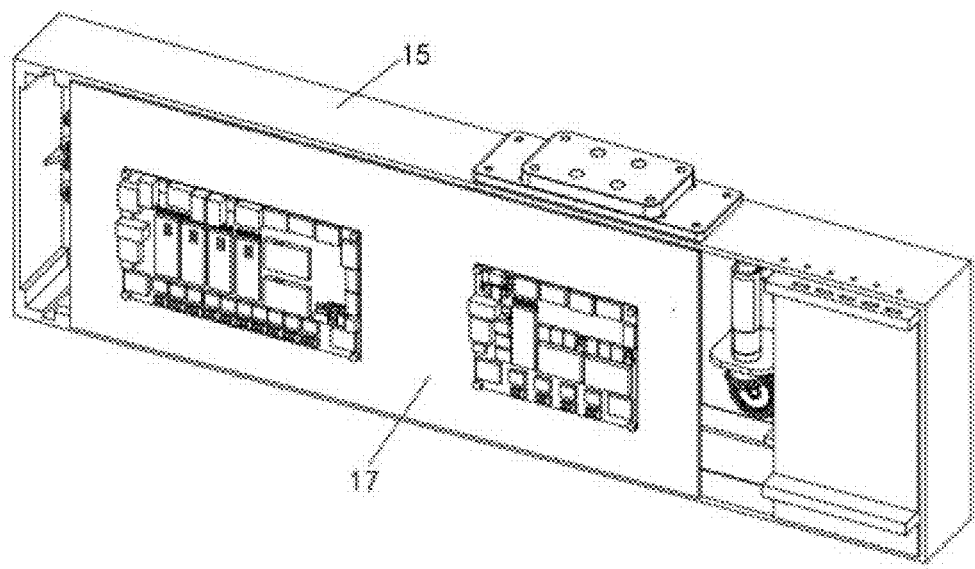
FIG. 25 is a first schematic diagram of the internal structure of the middle sheath driving unit and the inner sheath driving unit according to an embodiment of the present disclosure.

In this embodiment, as shown in FIG. 25, the middle sheath driving unit 12 further includes a second power compartment housing 15, with the first and second middle sheath bending drive assemblies 12a and 12b being arranged therein. In order to improve the stability of the first and second middle sheath bending drive assemblies 12a and 12b when moving with the middle sheath translation mounting plate 122c, the first and second middle sheath bending drive assemblies 12a and 12b each are slidably connected to the second power compartment housing 15. In one embodiment, a guide rail is provided in the second power compartment housing 15, and the first and second middle sheath bending drive assemblies 12a and 12b are provided with respective sliders slidably connected to the guide rail.

A second circuit board 17 is further provided in the second power compartment housing 15, and configured to control the first middle sheath bending drive assembly 12a, the second middle sheath bending drive assembly 12b and the middle sheath translation drive assembly 12c.

Currently, mitral regurgitation is typically treated through a minimally invasive procedure, which involves guiding a valve repair instrument to the mitral valve via a delivery system, and repairing the diseased mitral valve through remote operations outside the patient's body. The delivery system generally includes a plurality of sheath units, each typically including a sheath and a control device, such as a handle, connected to the sheath for manipulation thereof. In this embodiment, the delivery system may include an outer sheath unit, a middle sheath unit, and an inner sheath unit.

The outer sheath unit includes an outer sheath, which needs to enter the right atrium via the femoral vein, and then be bent while having its distal end oriented by rotation to face the atrial septum, thereby enabling the outer sheath to penetrate the atrial septum under the guidance of a guide wire to enter the left atrium.

The middle sheath unit includes a middle sheath capable of bending left and right in both the first and second planes that are set at an angle to each other. When the outer sheath reaches the left atrium, the middle sheath passes through the outer sheath and extends out of the left atrium. During the movement of the middle sheath relative to the outer sheath, it is also necessary to adjust the bending directions and degrees of the middle sheath in the first and second planes in real time based on the orientation and curvature of the outer sheath, for ensuring that the middle sheath can reach the appropriate position.

The inner sheath unit includes an inner sheath with a valve repair instrument at its distal end. The inner sheath can pass through the middle sheath and extend into the left atrium, and then be bent toward the mitral valve and continue to extend, thereby delivering the valve repair instrument to the mitral valve. In one embodiment, the valve repair instrument may include clamps for respectively clamping the two leaflets of the mitral valve.

However, the sheath system requires manual operations by surgeons, and due to its high operational difficulty, demands a relatively high level of technical skill and clinical experience from surgeons, resulting in prolonged learning curves for surgeons, which to a certain extent restricts the development of surgical procedures or the clinical application of the instrument. Moreover, during the procedures, surgeons often need to perform operations with the assistance of CT equipment, which exposes the surgeons to prolonged radiation exposure, causing a certain degree of harm to their health.

This embodiment provides a middle sheath adapter 3 configured to control a sheath unit. The sheath unit 202 in this embodiment is described by taking the middle sheath unit as an example. As shown in FIG. 5, the sheath unit 202 includes a middle sheath handle 2021, a middle sheath 2022, a first middle sheath driving wheel 2023, and a second middle sheath driving wheel 2024. The first middle sheath driving wheel 2023 is configured to drive the middle sheath 2022 to bend left and right in the first plane, and the second middle sheath driving wheel 2024 is configured to drive the middle sheath 2022 to bend left and right in the second plane.

As shown in FIGS. 28 to 32, the middle sheath adapter 3 includes a middle sheath mounting frame 33, a first middle sheath driving assembly 31 and a second middle sheath driving assembly 32, where the middle sheath handle 2021 is mounted on the middle sheath mounting frame 33, and the first and second middle sheath driving wheels 2023 and 2024 are respectively located at the top and the side of the middle sheath handle 2021. The first middle sheath driving assembly 31 includes a first middle sheath bending transmission shaft 311 that is rotatably mounted on the middle sheath mounting frame 33 and in transmission connection to the first middle sheath driving wheel 2023. The second middle sheath driving assembly 32 includes a second middle sheath bending transmission shaft 321 that is rotatably amounted on the middle sheath mounting frame 33 and in transmission connection to the second middle sheath driving wheel 2024.

In the middle sheath adapter 3, the first and second middle sheath driving assemblies 31 and 32 can drive the middle sheath 2022 to bend in different directions respectively, which is achieved by driving the first middle sheath driving wheel 2023 to rotate through the first middle sheath bending transmission shaft 311 and driving the second middle sheath driving wheel 2024 to rotate through the second middle sheath bending transmission shaft 321. Therefore, movement of the middle sheath mounting frame 33 along the axial direction of the middle sheath handle 2021 and adjustment of the bending direction and degree of the middle sheath 2022 based on the preset route enables the middle sheath 2022 to reach the desired position.

The middle sheath adapter 3 enables remote control of the middle sheath 2022, thereby improving the working environment for surgeons, while improving the stability and precision of surgical procedures, thus reducing the operational difficulty and shortening the learning curves for surgeons to master complex surgical procedures.

In one embodiment, the first middle sheath driving assembly 31 further includes a first middle sheath transmission worm 312, and the first middle sheath driving wheel 2023 is a worm gear. The middle sheath mounting frame 33 is fixedly provided with a middle sheath support frame 331, with the first middle sheath transmission worm 312 being rotatably provided thereon, where the first middle sheath transmission worm 312 is in transmission connection to the first middle sheath bending transmission shaft 311, and meshed with the first middle sheath driving wheel 2023. The worm gear transmission structure utilized for driving the rotation of first middle sheath driving wheel 2023 can not only change the transmission direction, allowing optimized positioning of the first middle sheath bending transmission shaft 311, but also function as a speed reduction mechanism, which significantly reduces the rotation speed of the first middle sheath driving wheel 2023 compared to that of the first middle sheath bending transmission shaft 311, thereby enabling smoother and more stable rotation of the first middle sheath driving wheel 2023, and facilitating precise control over the rotation angle of the first middle sheath driving wheel 2023, thus enhancing the safety of surgical procedures.

In one embodiment, the middle sheath support frame 331 features a box-like structure, where a first middle sheath connection hole 3311 is formed on the side facing the first middle sheath driving wheel 2023, and the first middle sheath driving wheel 2023 at least partially extends thereinto. The box-like structure enables protection for components such as the first middle sheath bending transmission shaft 311 and the first middle sheath transmission worm 312. In addition, since the first middle sheath driving wheel 2023 and the first middle sheath transmission worm 312 are meshed only through the first middle sheath connection hole 3311, dust ingress can be effectively prevented, thereby avoiding any impact on transmission accuracy and enhancing their service lives.

In one embodiment, the first middle sheath driving assembly 31 further includes a first middle sheath bevel gear 313, a second middle sheath bevel gear 314 and a transmission member, where the first middle sheath bevel gear 313 is fixedly connected to the first middle sheath bending transmission shaft 311, the second middle sheath bevel gear 314 is rotatably mounted on the middle sheath mounting frame 33, with the first and second middle sheath bevel gears 313 and 314 being meshed with each other, and the transmission member is in transmission connection with the second middle sheath bevel gear 314 and the first middle sheath transmission worm 312. The first middle sheath bending transmission shaft 311 drives the first middle sheath transmission worm 312 to rotate through the first and second middle sheath bevel gears 313 and 314, thereby driving the first middle sheath driving wheel 2023 to rotate through the first middle sheath transmission worm 312 to adjust the bending direction and degree of the middle sheath 2022 in the first plane. The transmission engagement between the first middle sheath bevel gear 313, the second middle sheath bevel gear 314 and the first middle sheath transmission worm 312 enables flexible positioning of the first middle sheath bending transmission shaft 311, thereby allowing for the selection of an optimal position to save space.

In one embodiment, the transmission member is a synchronous belt tensioned between the second middle sheath bevel gear 314 and the first middle sheath transmission worm 312. The synchronous belt enables synchronous rotation of the second middle sheath bevel gear 314 and the first middle sheath transmission worm 312. Moreover, the synchronous belt can not only reduce the assembly precision requirements for the second middle sheath bevel gear 314 and the transmission worm, but also ensure the transmission accuracy at a low cost.

In one embodiment, the second middle sheath driving assembly 32 further includes a second middle sheath transmission worm 322, and the second middle sheath driving wheel 2024 is a worm gear. The second middle sheath bending transmission shaft 321 is in transmission connection to the second middle sheath transmission worm 322, and the second middle sheath transmission worm 322 and the second middle sheath driving wheel 2024 that is a worm gear are meshed with each other, thereby changing the transmission direction, as well as enabling precise control over the rotation angle of the second middle sheath driving wheel 2024, thus enhancing the safety of surgical procedures.

In one embodiment, the middle sheath mounting frame 33 includes a detachably connected middle sheath base 332 and a middle sheath cover plate 333, for the second middle sheath transmission worm 322 and the second middle sheath bending transmission shaft 321 to be mounted therebetween, where the cover plate 333 is provided with a second middle sheath connection hole 3331 thereon, and the second middle sheath driving wheel 2024 at least partially extends into the second middle sheath connection hole 3331. The middle sheath base 332 and the middle sheath cover plate 333 can protect the second middle sheath transmission worm 322 and the second middle sheath bending transmission shaft 321, while providing clearance for the second middle sheath driving wheel 2024 through the second middle sheath connection hole 3331, allowing the second middle sheath driving wheel 2024 to mesh with the second middle sheath transmission worm 322, which not only ensures the power transmission, but also enables dust-proofing, preventing dust from entering between the middle sheath base 332 and the middle sheath cover plate 333 and causing wear on the transmission structure that affects the transmission accuracy, thereby extending the service life.

In one embodiment, the second middle sheath driving assembly 32 further includes a third middle sheath bevel gear 323 and a fourth middle sheath bevel gear 324, where the third middle sheath bevel gear 323 is coaxially secured to the second middle sheath bending transmission shaft 321, and the fourth middle sheath bevel gear 324 is coaxially secured to the second middle sheath transmission worm 322, with the third and fourth middle sheath bevel gears 323 and 324 being meshed with each other.

In one embodiment, the first middle sheath bending transmission shaft 311, and the first and second middle sheath bevel gears 313 and 314 are also disposed between the middle sheath base 332 and the middle sheath cover plate 333, and the synchronous belt passes through the middle sheath cover plate 333.

In one embodiment, the middle sheath adapter 3 further includes a middle sheath buckle 34 detachably connected to the middle sheath mounting frame 33, and the middle sheath handle 2021 is at least partially located between the middle sheath buckle 34 and the middle sheath mounting frame 33. The middle sheath buckle 34 and the middle sheath mounting frame 33 can secure the middle sheath handle 2021, and facilitate the removal and installation of the handle 2021, thereby enhancing the efficiency of preoperative preparation.

In one embodiment, the middle sheath mounting frame 33 is provided with a plurality of middle sheath positioning members 3332 protruding therefrom, for locating the middle sheath handle 2021 therebetween. The configuration of the middle sheath positioning members 3332 can enhance the positional accuracy of the middle sheath handle 2021, while also improving the efficiency of its installation, thereby reducing the difficulty for operators when installing the middle sheath handle 2021.

In one embodiment, the plurality of middle sheath positioning members 3332 position the middle sheath handle 2021 through snap-fit connection with their corners, thereby reducing the contact area between the middle sheath positioning member 3332 and the middle sheath handle 2021, thus minimizing the risk of over-positioning caused by localized manufacturing tolerances in the middle sheath positioning members 3332, thereby maintaining the positional accuracy of the middle sheath handle 2021.

A surgical assistance system according to the present embodiment includes a sheath adapter 3, and further includes an actuation power apparatus 500, which can drive the first middle sheath bending transmission shaft 311 and the first middle sheath transmission worm 321 to rotate, and can also drive the sheath adapter 3 to move along the axial direction of the middle sheath handle 2021.

In one embodiment, the actuation power apparatus 500 is configured to provide rotational power to the first middle sheath bending transmission shaft 311 and the first middle sheath transmission worm 321, allowing operators to remotely control the number of turns of the first middle sheath bending transmission shaft 311 and the first middle sheath transmission worm 321 to control the bending direction and degree of the middle sheath 2022. Moreover, the actuation power apparatus 500 enables axial movement of the middle sheath handle 2021, thereby controlling the middle sheath 2022 to move forward or backward.

As shown in FIGS. 26, and 33 to 38, the inner sheath driving unit 13 includes at least one of the inner sheath translation drive assembly 13*a* and the inner sheath rotation drive assembly 13*b*, and at least one of the open-and-close control assembly 13*c*, the first control assembly 13*d*, the second control assembly 13*e* and the locking assembly 13*f*.

The inner sheath translation drive assembly 13*a* is connected to the inner sheath translation drive rod 411 of the inner sheath adapter 4, and configured to drive the inner sheath unit 203 to move axially.

Figure 33:
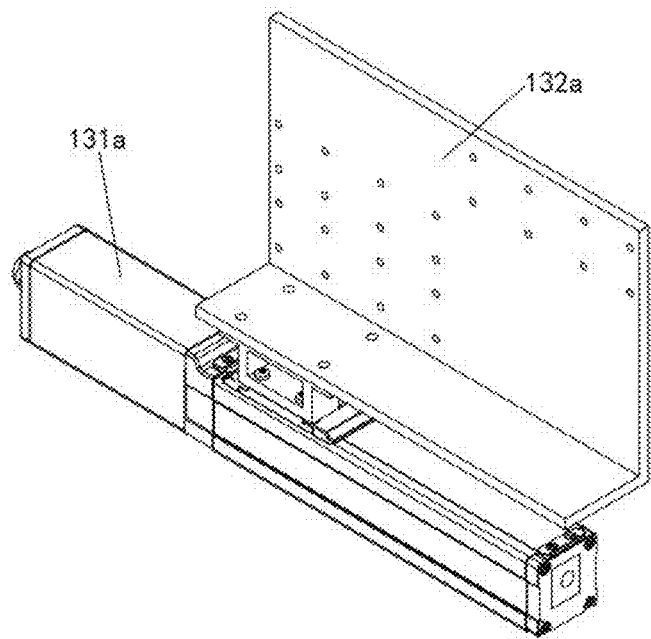
FIG. 33 is a schematic structural diagram of the inner sheath translation drive assembly according to an embodiment of the present disclosure.
Figure 38:
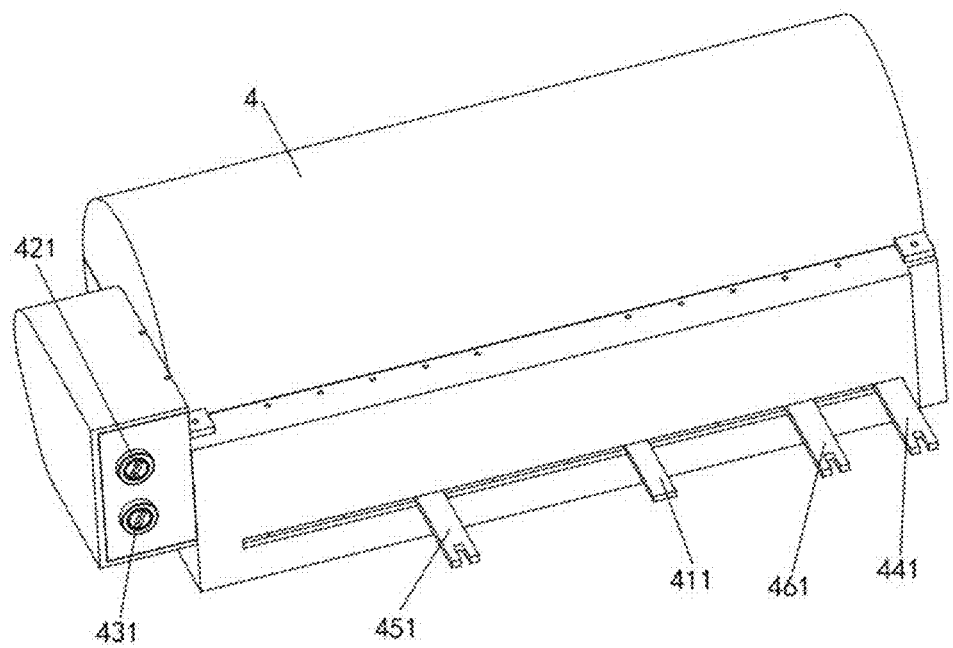
FIG. 38 is a second schematic structural diagram of the inner sheath adapter according to an embodiment of the present disclosure.

In one embodiment, as shown in FIGS. 26, 33 and 38, the inner sheath translation drive assembly 13*a* includes an inner sheath translation drive member 131*a* and an inner sheath translation mounting plate 132*a*. The inner sheath translation drive member 131*a* has an output end connected to the inner sheath translation drive rod 411, with the inner sheath translation mounting plate 132*a* being connected to the output end of the inner sheath translation drive member 131*a*, and the first control assembly 13*d*, the second control assembly 13*e* and the locking assembly 13*f* each are mounted on the inner sheath translation mounting plate 132*a*, thereby maintaining effective connection of the first control assembly 13*d*, the second control assembly 13*e* and the locking assembly 13*f* to the inner sheath adapter 4 during the horizontal movement of the inner sheath unit 203, thus enabling effective control over the fixation elements 204 and the clamping elements 205.

In one embodiment, the inner sheath translation drive member 131a is an electric cylinder, thereby achieving a simple structure and facilitating ease of control.

As shown in FIGS. 26 and 38, the inner sheath rotation drive assembly 13b is connected to the inner sheath rotation transmission shaft 421 of the inner sheath adapter 4, and configured to drive the inner sheath unit 203 to rotate about its own axis.

In one embodiment, the inner sheath rotation drive assembly 13b includes an inner sheath rotation drive member 131b, an inner sheath rotation transmission member 132b, and an inner sheath rotation drive shaft 133b, where the inner sheath rotation drive member 131b is drivingly connected to the input end of the inner sheath rotation transmission member 132b, and the inner sheath rotation drive shaft 133b has a first end connected to the output end of the inner sheath rotation transmission member 132b and a second end connected to the inner sheath rotation transmission shaft 421. The power output by the inner sheath rotation drive member 131b drives the inner sheath rotation drive shaft 133b to rotate through the inner sheath rotation transmission member 132b, thereby driving the inner sheath unit 203 to rotate about its own axis.

The inner sheath rotation drive member 131b is a motor, and the inner sheath rotation transmission member 132b includes a first inner sheath rotation bevel gear and a second inner sheath rotation bevel gear, where the first inner sheath rotation bevel gear is connected to the output shaft of the motor, and the second inner sheath rotation bevel gear is connected to the inner sheath rotation drive shaft 133b, with the first and second inner sheath rotation bevel gears being meshed with each other. The inner sheath rotation transmission member 132b changes the direction of the motor power transmission, thus allowing for a compact structure.

As shown in FIGS. 26 and 38, the open-and-close control assembly 13c is connected to an open-and-close transmission shaft 431 of the inner sheath adapter 4, which is configured to drive the rotation of the inner sheath driving wheel 2033 of the inner sheath unit 203 to open or close the fixation elements 204 connected to the inner sheath 2032.

In one embodiment, the open-and-close control assembly 13c includes an open-and-close drive member 131c, an open-and-close transmission member 132c and an open-and-close drive shaft 133c, where the open-and-close drive member 131c is drivingly connected to the input end of the open-and-close transmission member 132c, and the open-and-close drive shaft 133c has a first end connected to the output end of the open-and-close transmission member 132c and a second end connected to the open-and-close drive shaft 431. The power output by the open-and-close drive member 131c drives the open-and-close drive shaft 133c to rotate through the open-and-close transmission member 132c, which in turn drives the open-and-close drive shaft 431 to rotate, thereby driving the fixation elements 204 to open or close. The driving force of the open-and-close drive member 131c drives the open-and-close drive shaft 133c to rotate through the open-and-close transmission member 132c, which in turn drives the open-and-close drive shaft 431 to rotate, thereby driving the inner sheath driving wheel 2033 on the inner sheath handle 2031 to rotate, thus enabling the opening or closing of the fixation elements 204.

The open-and-close drive member 131c is a motor, and the open-and-close transmission member 132c includes a first open-and-close bevel gear and a second open-and-close bevel gear, where the first open-and-close bevel gear is connected to the output end of the motor, and the second open-and-close bevel gear is connected to the open-and-close drive shaft 133c, with the first and second open-and-close bevel gears being meshed with each other. The configuration of the open-and-close transmission member 132c changes the direction of the motor power transmission, thus allowing for a compact structure.

Figure 34:
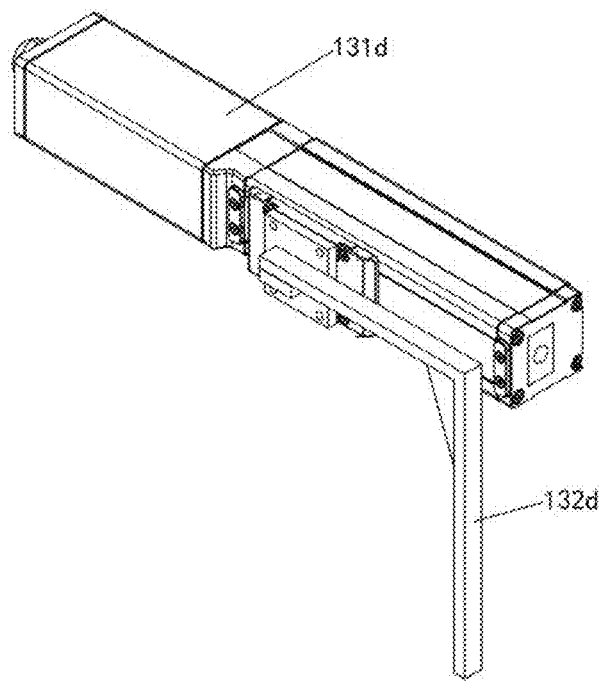
FIG. 34 is a schematic structural diagram of the first control assembly according to an embodiment of the present disclosure.

As shown in FIGS. 26, 34 and 38, the first control assembly 13d is connected to the first drive rod 441 of the inner sheath adapter 4, and configured to drive the first operation lever 2034 of the inner sheath unit 203 to move, thereby enabling opening or closing of one of the clamping elements 205 connected to the inner sheath 2032.

In one embodiment, the first control assembly 13d includes a first driving member 131d and a first connection rod 132d connected to the output end of the first driving member 131d, where the first connection rod 132d is connected to the first drive rod 441. The first driving member 131d drives the first connection rod 132d to move, which in turn drives the first drive rod 441 to move, thereby driving the first operation lever 2034 to move, thus controlling opening or closing of the clamping element 205.

The first driving member 131d is an electric cylinder mounted on the inner sheath translation drive mounting plate 132a of the inner sheath translation drive assembly 13a.

Figure 35:
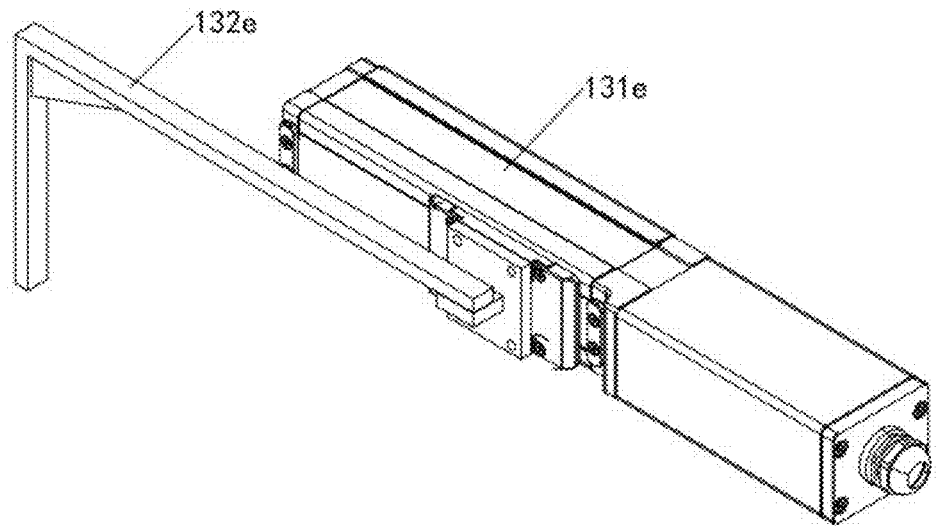
FIG. 35 is a schematic structural diagram of the second control assembly according to an embodiment of the present disclosure.

As shown in FIGS. 26, 35 and 38, the second control assembly 13e is connected to the second drive rod 451 of the inner sheath adapter 4, and configured to drive the second operation lever 2035 of the inner sheath unit 203 to move for opening or closing another clamping element 205 connected to the inner sheath 2032.

In one embodiment, the second control assembly 13e includes a second driving member 131e and a second connection rod 132e connected to the output end of the second driving member 131e, where the second connection rod 132e is connected to the second drive rod 451. The second driving member 131e drives the second connection rod 132e to move, which in turn drives the second drive rod 451 to move, thereby driving the second operation lever 2035 to move, thus enabling opening or closing of the clamping element 205.

The second driving member 131e is an electric cylinder installed on the inner sheath translation mounting plate 132a of the inner sheath translation drive assembly 13a.

Figure 36:
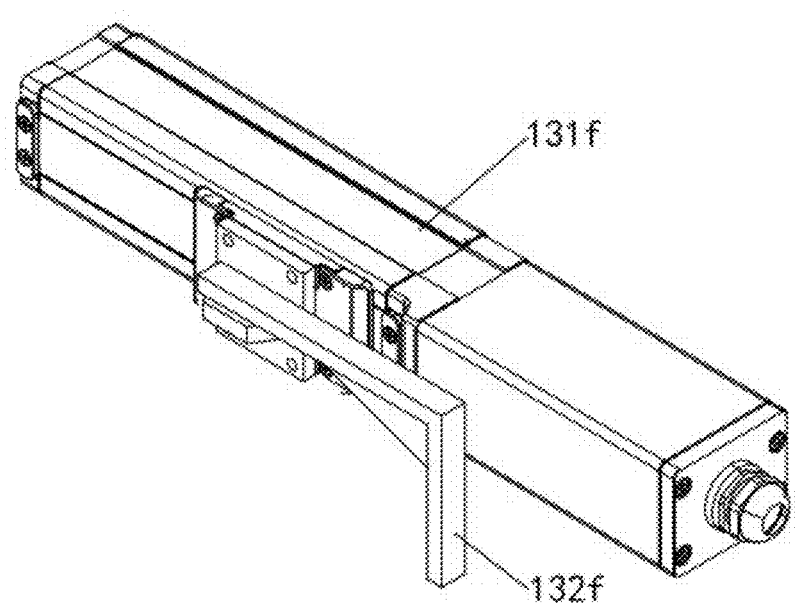
FIG. 36 is a schematic structural diagram of the locking assembly according to an embodiment of the present disclosure.
Figure 37:
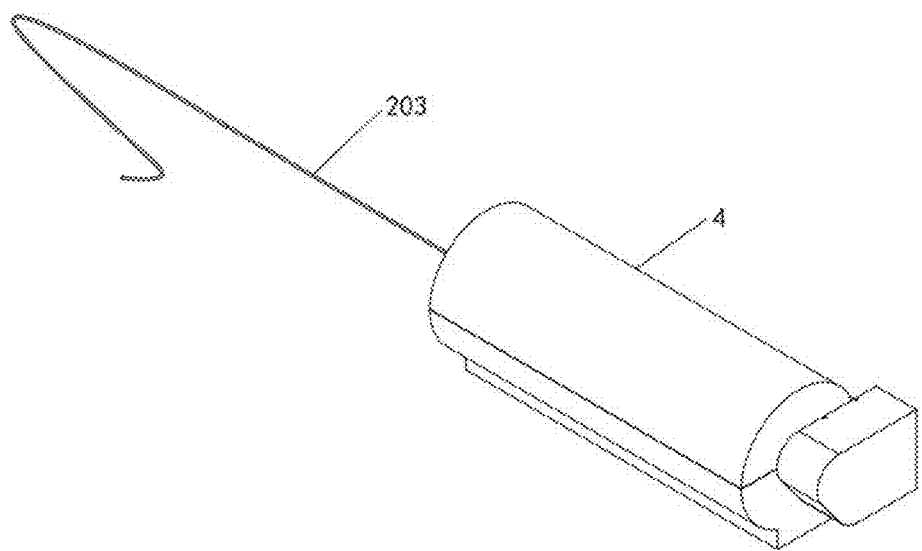
FIG. 37 is a first schematic structural diagram of the inner sheath adapter according to an embodiment of the present disclosure.

As shown in FIGS. 26, 36 and 38, the locking assembly 13f is connected to the locking drive rod 461 of the inner sheath adapter 4, and configured to drive the locking operation lever 2036 on the inner sheath handle 2031 to move, thereby locking or unlocking the clamping element 205 and the fixation element 204.

In one embodiment, the locking assembly 13f includes a locking driving member 131f and a locking connection rod 132f connected to the output end of the locking driving member 131f, where the locking connection rod 132f is connected to the locking drive rod 461. The locking driver 131f drives the locking connection rod 132f to move, which in turn drives the locking drive rod 461 to move, thereby driving the locking operation lever 2036 to move, thus enabling locking and unlocking of the fixation elements 204 and the clamping elements 205.

The inner sheath driving unit 13 according to the present embodiment is installed in the second power compartment housing 15, and the second circuit board 17 controls the inner sheath translation drive assembly 13a, the inner sheath rotation drive assembly 13b, the open-and-close control assembly 13c, the first control assembly 13d, the second control assembly 13e and the locking assembly 13f to actuate the inner sheath 2032, the fixation elements 204 and the clamping elements 205, thereby replacing the full manual operation by surgeons, thus enhancing the accuracy and efficiency of surgical procedures.

As shown in FIGS. 37 to 42, the inner sheath adapter 4 includes an inner sheath translation transmission unit 41 and an inner sheath rotation transmission unit 42. The inner sheath translation transmission unit 41 is configured to support the inner sheath handle 2031, and the inner sheath driving unit 13 is drivingly connected to the inner sheath translation transmission unit 41 to drive the inner sheath unit 203 to move axially. The output end of the inner sheath rotation transmission unit 42 is drivingly connected to the inner sheath translation transmission unit 41, and the inner sheath driving unit 13 is drivingly connected to the input end of the inner sheath rotation transmission unit 42 to drive the inner sheath unit 203 to rotate about its own axis.

The inner sheath translation transmission unit 41 includes a translation telescopic assembly 412 configured to support the inner sheath unit 203 and an inner sheath translation drive rod 411 connected at one end to the telescoping portion 4121 of the translation telescopic assembly 412, where the inner sheath translation drive rod 411 is connected to the output end of the inner sheath translation drive member 131a, and the inner sheath translation drive member 131a drives the inner sheath translation drive rod 411 to move to drive the telescoping portion 4121 to translate. The inner sheath rotation transmission unit 42 is drivingly connected at one end to the translation telescopic assembly 412, with its input end being connected to the inner sheath rotation drive shaft 133b, enabling the translation telescopic assembly 412 to be driven to rotate, thereby causing the inner sheath unit 203 to rotate about its own axis.

The inner sheath adapter 4 according to the present embodiment can support and actuate the inner sheath unit 203, for example, drive its forward and backward movement and rotation, thereby replacing manual operations by surgeons and reducing the operational difficulty of the inner sheath unit 203, thus lowering the technical skill and clinical experience required for surgeons, which in turn enhances the precision of surgical procedures, and ultimately improves the success rate of the operation.

Figure 39:
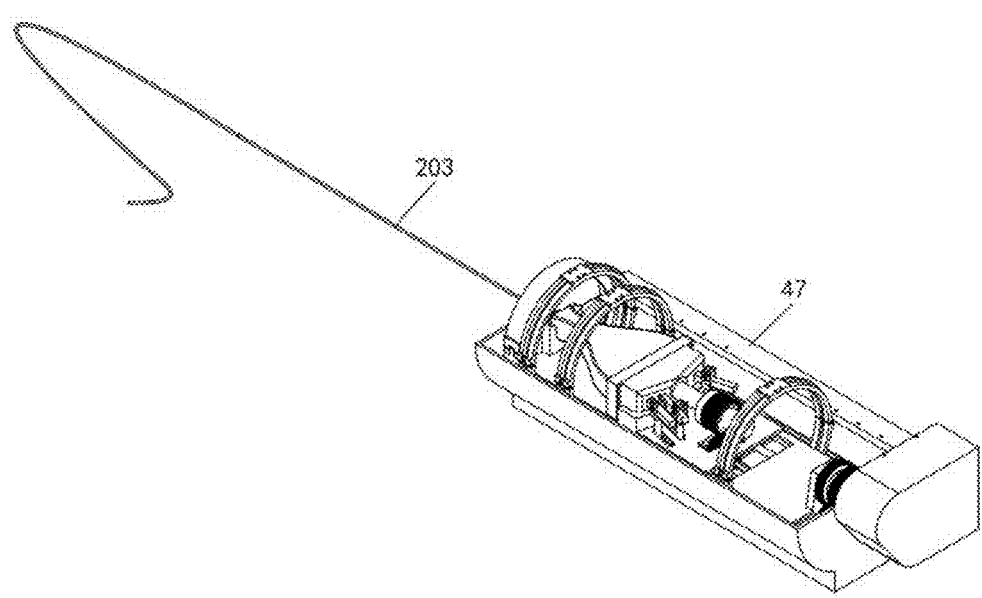
FIG. 39 is a schematic diagram of the internal structure of the inner sheath adapter according to an embodiment of the present disclosure.
Figure 40:
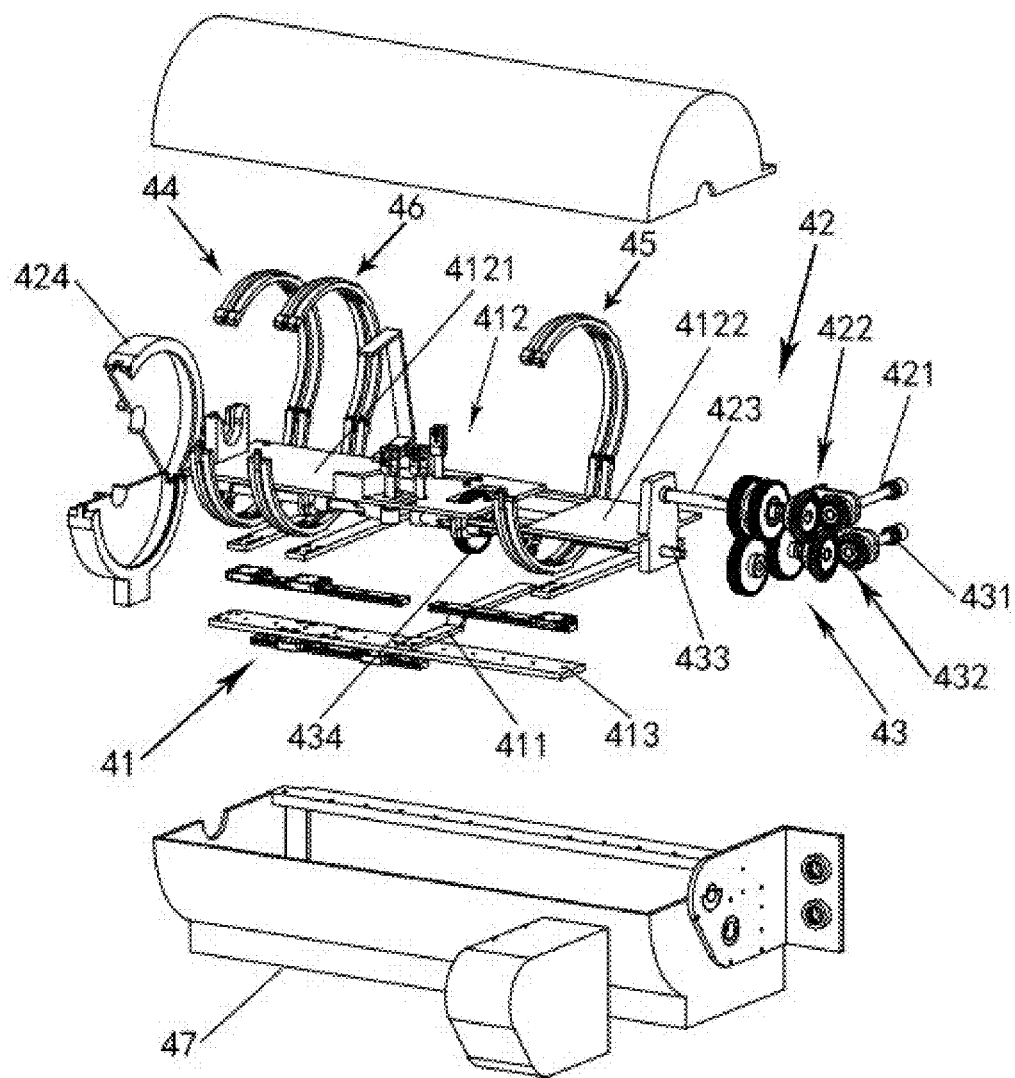
FIG. 40 is a first schematic structural diagram of the inner sheath adapter in an exploded state according to an embodiment of the present disclosure.
Figure 41:
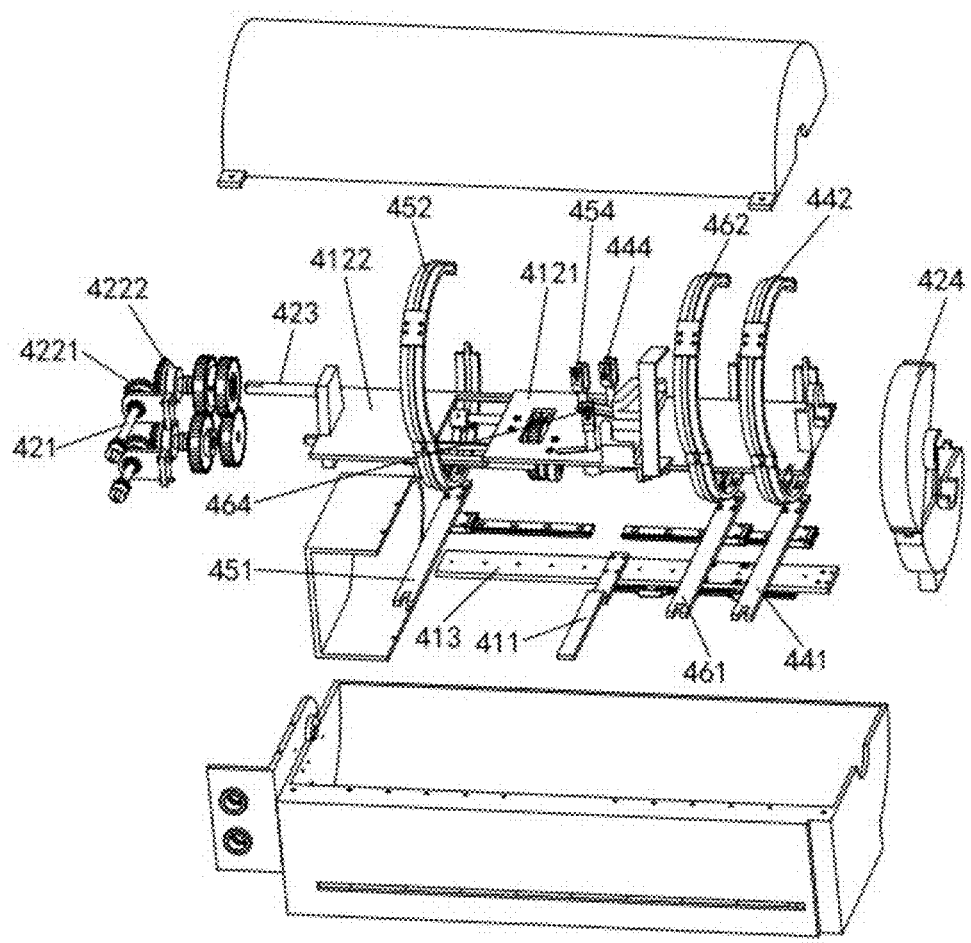
FIG. 41 is a second schematic structural diagram of the inner sheath adapter in an exploded state according to an embodiment of the present disclosure.
Figure 42:
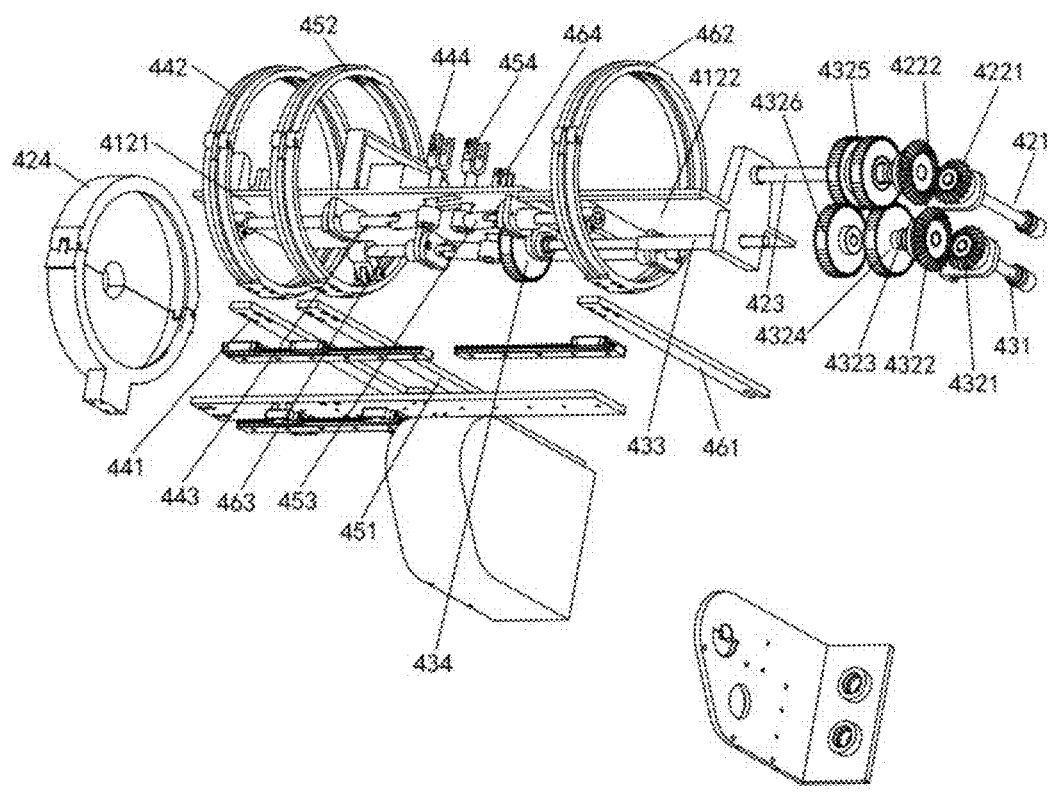
FIG. 42 is a third schematic structural diagram of the inner sheath adapter in an exploded state according to an embodiment of the present disclosure.

As shown in FIGS. 39 to 41, the inner sheath adapter 4 further includes an inner sheath housing 47, and the translation telescopic assembly 412 further includes a fixed portion 4122 slidably connected to the first end of the telescoping portion 4121, where the fixed portion 4122 is rotatably connected to the inner sheath housing 47, the second end of the telescoping portion 4121 is rotatably connected to an inner sheath translation plate 413 that is slidably connected to the inner sheath housing 47, with one end of the inner sheath translation drive rod 411 being connected to the inner sheath translation plate 413, enabling the inner sheath translation plate 413 to be driven to slide relative to the inner sheath housing 47 by actuating the inner sheath translation drive rod 411, which in turn drives the inner sheath unit 203 placed on the telescoping portion 4121 to translate, thus causing the inner sheath 2032 of the inner sheath unit 203 to move relative to the middle sheath 2022.

The inner sheath housing 47 includes a first housing and a second housing, where one side of the first housing is hinged to one side of the second housing, the inner sheath translation plate 413 is slidably connected to the bottom of the first housing, and the second housing is snap-fitted to the first housing. The first and second housings together form a cavity for accommodating the inner sheath translation transmission unit 41 and the inner sheath rotation transmission unit 42, and the inner sheath 2032 of the inner sheath unit 203 extends through the inner sheath housing 47 to the exterior.

A guide rail is provided at the bottom of the first housing, and a slider is provided on the inner sheath translation plate 413 to be slidably mounted on the guide rail. The telescoping portion 4121 includes a telescoping plate, and the fixed portion 4122 includes a fixed plate, with the first end of the telescoping plate being slidably connected to the first end of the fixed plate, where the second end of the fixed plate is connected to a first fixed support that is rotatably connected to the first housing, and the second end of the telescoping plate is rotatably connected to a translation plate. The first fixed support provides mounting support for the installation of the fixed plate.

In the present embodiment, the inner sheath rotation transmission unit 42 includes an inner sheath rotation transmission shaft 421 and an inner sheath rotation gear set 422, where the inner sheath rotation gear set 422 has a first end connected to the inner sheath rotation transmission shaft 421 and a second end drivingly connected to the rotation gear set shaft 423 that is fixedly connected to the fixed portion 4122. The rotation gear set shaft 423 is rotatably connected to the inner sheath housing 47. A rotation bearing is provided on the inner sheath translation plate 413, with the telescoping portion 4121 being rotatably connected thereto. When the inner sheath rotation transmission shaft 421 is driven, the driving force is transmitted to the rotation gear set shaft 423 through the inner sheath rotation gear set 422, thereby driving the translation telescopic assembly 412 to rotate about the rotation gear set shaft 423 to displace the distal end of the inner sheath 2032.

In one embodiment, the inner sheath rotation gear set 422 includes a first inner sheath rotation bevel gear 4221 and a second inner sheath rotation bevel gear 4222, where the first inner sheath rotation bevel gear 4221 is connected to the inner sheath rotation transmission shaft 421, and the second inner sheath rotation bevel gear 4222 is arranged on the rotating gear set shaft 423, with the first and second inner sheath rotation bevel gears 4221 and 4222 being meshed with each other. The structure of the inner sheath rotation gear set 422 is simple, and the direction of power input is perpendicular to the direction of power output, which changes the direction of power transmission, thus allowing for a more compact structure of the sheath assembly adapter that saves space.

The inner sheath adapter 4 further includes an open-and-close transmission unit 43 drivingly connected to the inner sheath driving wheel 2033, where the input end of the open-and-close transmission unit 43 is connected to the open-and-close drive shaft 133c, enabling the inner sheath driving wheel 2033 to be driven to rotate, thereby controlling opening and closing of the fixation element 204.

In one embodiment, the open-and-close transmission unit 43 includes an open-and-close transmission shaft 431, an open-and-close gear set 432, a retractable open-and-close gear shaft 433 and an open-and-close drive gear 434. The open-and-close gear set 432 has a first end connected to the open-and-close transmission shaft 431 and a second end capable of rotating with the open-and-close transmission shaft 431 to cause the rotation of the translation telescopic assembly 412, thereby driving the inner sheath unit 203 to rotate about its own axis. The open-and-close gear shaft 433 has a first end rotatably connected to the fixed portion 4122 and connected to the second end of the open-and-close gear set 432, and a second end rotatably connected to the telescoping portion 4121. The open-and-close gear shaft 433 is retractable to accommodate the translation of the telescoping portion 4121 of the translation telescopic assembly 412. The open-and-close drive gear 434 is connected to the open-and-close gear shaft 433, and the open-and-close drive gear 434 is meshed with the inner sheath driving wheel 2033. The open-and-close drive shaft 133c is connected to the open-and-close transmission shaft 431 to transmit power to the open-and-close gear set 432, which in turn drives the open-and-close gear shaft 433 to rotate about its own axis to cause the open-and-close drive gear 434 to rotate with the open-and-close gear shaft 433, thereby driving the inner sheath driving wheel 2033 to rotate, thus enabling adjustment of the fixation elements 204 connected to the distal end of the inner sheath 2032 to allow for control of the opening or closing of the fixation element 204.

In this embodiment, the open-and-close gear set 432 includes a first open-and-close bevel gear 4321, a second open-and-close bevel gear 4322, a bevel gear connection shaft 4323, a double-row gear 4325, and a second intermediate transmission gear 4326. The first open-and-close bevel gear 4321 is connected to the open-and-close transmission shaft 431, and the second open-and-close bevel gear 4322 is meshed with the first open-and-close bevel gear 4321. The second open-and-close bevel gear 4322 is provided at the first end of the bevel gear connection shaft 4323, and the first intermediate transmission gear 4324 is provided at the second end of the bevel gear connection shaft 4323. The double-row gear 4325 is mounted on the rotating gear set shaft 423, and the first intermediate transmission gear 4324 can selectively mesh with one of the gears in the double-row gear 4325. The second intermediate transmission gear 4326 is provided at one end of the open-and-close gear shaft 433, and meshes with another gear in the double-row gear 4325. The configuration of the first and second open-and-close bevel gears 4321 and 4322 changes the direction of power transmission, allowing for a more compact structural layout of the open-and-close gear set 432 that occupies less space.

In this embodiment, the inner sheath adapter 4 further includes a first transmission unit 44 drivingly connected to the first operation lever 2034 of the inner sheath unit 203, where the first transmission unit 44 has an input end connected to the first connection rod 132d, enabling the first operation lever 2034 to be driven to move axially. In this embodiment, the movement of the first operation lever 2034 can drive one of the clamping elements 205 at the distal end of the inner sheath 2032 to open or close.

In one embodiment, the first transmission unit 44 includes a first drive rod 441, a first annular member 442, a first connection rod 443 and a first clamping member 444. The first drive rod 441 is slidably connected to the inner sheath translation plate 413 to accommodate the movement of the telescoping portion 4121 of the translation telescopic assembly 412. The first annular member 442 surrounds the translation telescopic assembly 412 and is fixedly connected to the first drive rod 441. The first end of the first connection rod 443 is slidably connected to the inner wall of the first annular member 442 to accommodate the rotation of the translation telescopic assembly 412, so that the first annular member 442 guides the rotation of the first connection rod 443. The middle part of the first connection rod 443 is slidably connected to the bottom of the telescoping portion 4121 to accommodate the movement of the telescoping portion 4121 of the translation telescopic assembly 412. The first drive rod 441 is connected to the first connection rod 132d, driving the first drive rod 441 to translate, and the first drive rod 441 drives the first annular member 442 to translate, thereby driving the first connection rod 443 to slide relative to the inner sheath translation plate 413. The second end of the first connection rod 443 is universally connected to the first clamping member 444, the other end of which passes through the first elongated slot of the telescoping portion 4121 and is connected to the first operation lever 2034. When the first connection rod 443 moves, the first clamping member 444 drives the first operation lever 2034 to move horizontally, thereby controlling one of the clamping elements 205 at the distal end of the inner sheath 2032 to open or close.

The aforementioned first annular member 442 includes two semi-annular members, where the two semi-annular members are hinged at respective first ends, and are detachably connected at respective second ends, allowing one of the semi-annular members to be opened for placing and removing the inner sheath unit 203.

The inner sheath adapter 4 further includes a second transmission unit 45 drivingly connected to the second operation lever 2035 of the inner sheath unit 203, where the input end of the second transmission unit 45 is connected to the second connection rod 132e, enabling the second operation lever 2035 to be driven to move axially. In this embodiment, the movement of the second operation lever 2035 can drive another clamping element 205 at the distal end of the inner sheath 2032 to open or close.

In one embodiment, the second transmission unit 45 includes a second drive rod 451, a second annular member 452, a second connection rod 453 and a second clamping member 454. The second drive rod 451 is slidably connected to the inner sheath translation plate 413, and the second annular member 452 surrounds the translation telescopic assembly 412 and is fixedly connected to the second drive rod 451. The first end of the second connection rod 453 is slidably connected to the inner wall of the second annular member 452 to accommodate the rotation of the translation telescopic assembly 412, so that the second annular member 452 guides the rotation of the second connection rod 453. The middle part of the second connection rod 453 is slidably connected to the bottom of the telescoping portion 4121 to accommodate the movement of the telescoping portion 4121 of the translation telescopic assembly 412. The second drive rod 451 is connected to the second connection rod 132e, driving the second drive rod 451 to translate, and the second drive rod 451 drives the second annular member 452 to translate, thereby driving the second connection rod 453 to slide relative to the inner sheath translation plate 413. The second end of the second connection rod 453 is universally connected to the second clamping member 454, one end of which passes through the second elongated slot of the telescoping portion 4121 and is connected to the second operation lever 2035. When the second connection rod 453 moves, the second clamping member 454 drives the closing operation lever 2035 to move horizontally, thereby controlling the opening or closing of another clamping element 205 at the distal end of the inner sheath 2032.

The second annular member 452 includes two semi-annular members, where the two semi-annular members are hinged at respective first ends, and are detachably connected at respective second ends, enabling one of the semi-annular members to be opened for placing and removing the inner sheath unit 203.

The inner sheath adapter 4 further includes a locking transmission unit 46 drivingly connected to the locking operation lever 2036 of the inner sheath unit 203, where the locking transmission unit 46 is connected to the locking connection rod 132f, thus allowing the locking operation lever 2036 to be driven to move axially. In this embodiment, the movement of the locking operation lever 2036 enables locking or unlocking of the fixation elements 204 and the clamping elements 205 at the distal end of the inner sheath 2032.

In one embodiment, the locking transmission unit 46 includes a locking drive rod 461, a locking annular member 462, a locking connection rod 463 and a locking clamping member 464. The locking drive rod 461 is slidably connected to the inner sheath translation plate 413, and the locking annular member 462 surrounds the translation telescopic assembly 412 and is fixedly connected to the locking drive rod 461. The first end of the locking connection rod 463 is slidably connected to the inner wall of the locking ring 462 to accommodate the rotation of the translation telescopic assembly 412, so that the locking ring 462 guides the rotation of the locking connection rod 463. The middle part of the locking connection rod 463 is slidably connected to the bottom of the telescoping portion 4121 to accommodate the movement of the telescoping portion 4121 of the translation telescopic assembly 412. The locking drive rod 461 is connected to the locking connection rod 132*f* to be driven to translate, and the locking drive rod 461 drives the locking ring 462 to translate, thereby driving the locking connection rod 463 to slide relative to the inner sheath translation plate 413. The second end of the locking connection rod 463 is universally connected to the locking clamp 464, one end of which passes through the third elongated hole of the telescoping portion 4121 and is connected to the locking operation lever 2036. When the locking connection rod 463 moves, the locking clamp 464 drives the locking operation lever 2036 to move horizontally, thereby locking or unlocking the clamping elements 205 and the fixation elements 204 at the distal end of the inner sheath 2032.

The inner sheath adapter 4 enables precise control of the inner sheath unit 203, including horizontal movement of the inner sheath unit 203, rotation of the inner sheath 2032, opening and closing of the fixation elements 204 at the distal end of the inner sheath 203, opening and closing of the clamping elements 205 at the distal end of the inner sheath 203, and locking and unlocking of the fixation elements 204 and the clamping elements 205 at the distal end of the inner sheath 2032, thereby replacing the full manual operation by surgeons, thus enhancing the accuracy and efficiency of surgical procedures.

What is claimed is:

1. An actuation power apparatus adapted for driving a catheter system (200) that comprises an outer sheath unit (201), a middle sheath unit (202) and an inner sheath unit (203), the actuation power apparatus comprising:
    an outer sheath driving unit (11) drivingly connected to an outer sheath adapter (2) for supporting the outer sheath unit (201), and configured to actuate the outer sheath unit (201) through the outer sheath adapter (2);
    a middle sheath driving unit (12) drivingly connected to a middle sheath adapter (3) for supporting the middle sheath unit (202), and configured to actuate the middle sheath unit (202) through the middle sheath adapter (3); and
    an inner sheath driving unit (13) drivingly connected to an inner sheath adapter (4) for supporting the inner sheath unit (203), and configured to actuate the inner sheath unit (203) through the inner sheath adapter (4),
    wherein the inner sheath driving unit (13) comprises at least one of:
    an inner sheath translation drive assembly (13*a*) connected to an inner sheath translation drive rod (411) of the inner sheath adapter (4), and configured to drive the inner sheath unit (203) to move axially; and
    an inner sheath rotation drive assembly (13*b*) connected to an inner sheath rotation transmission shaft (421) of the inner sheath adapter (4), and configured to drive the inner sheath unit (203) to rotate about its own axis, and
    the inner sheath driving unit (13) further comprises at least one of:
    an open-and-close control assembly (13*c*) connected to an open-and-close transmission shaft (431) of the inner sheath adapter (4), and configured to drive an inner sheath driving wheel (2033) of the inner sheath unit (203) to rotate for opening or closing a fixation element (204) connected to an inner sheath (2032) of the inner sheath unit (203);
    a first control assembly (13*d*) connected to a first drive rod (441) of the inner sheath adapter (4), and configured to drive a first operation lever (2034) of the inner sheath unit (203) to move for opening or closing one of clamping elements (205) connected to the inner sheath (2032);
    a second control assembly (13*e*) connected to a second drive rod (451) of the inner sheath adapter (4), and configured to drive a second operation lever (2035) of the inner sheath unit (203) to move for opening or closing another of the clamping elements (205) connected to the inner sheath (2032); and
    a locking assembly (13*f*) connected to a locking drive rod (461) of the inner sheath adapter (4), and configured to drive a locking operation lever (2036) on an inner sheath handle (2031) of the inner sheath unit (203) to move for locking or unlocking the clamping elements (205) and the fixation element (204).

2. The actuation power apparatus according to claim 1, wherein the outer sheath driving unit (11) comprises:
    an outer sheath bending drive assembly (11*a*) drivingly connected to a second outer sheath transmission shaft (221) of the outer sheath adapter (2), and configured to adjust bending of a distal end of an outer sheath (2012) of the outer sheath unit (201); and
    an outer sheath rotation drive assembly (11*b*) drivingly connected to a first outer sheath transmission shaft (211) of the outer sheath adapter (2), and configured to drive the outer sheath unit (201) to rotate about its own axis.

3. The actuation power apparatus according to claim 2, wherein the outer sheath bending drive assembly (11*a*) comprises:
    an outer sheath bending drive member (111*a*);
    an outer sheath bending transmission member (112*a*) having an input end to which the outer sheath bending drive member (111*a*) is drivingly connected; and
    an outer sheath bending drive shaft (113*a*) having a first end connected to an output end of the outer sheath bending transmission member (112*a*) and a second end connected to the second outer sheath transmission shaft (221).

4. The actuation power apparatus according to claim 2, the outer sheath rotation drive assembly (11*b*) comprises:
    an outer sheath rotation drive member (111*b*);
    an outer sheath rotation transmission member (112*b*) having an input end to which the outer sheath rotation drive member (111*b*) is drivingly connected; and
    an outer sheath rotation drive shaft (113*b*) having a first end connected to an output end of the outer sheath rotation transmission member (112b) and a second end connected to the first outer sheath transmission shaft (211).

5. The actuation power apparatus according to claim 1, wherein the middle sheath driving unit (12) comprises at least one of:
a first middle sheath bending drive assembly (12a) drivingly connected to a first middle sheath bending transmission shaft (311) of the middle sheath adapter (3), and configured to adjust a bending angle of a distal end of a middle sheath (2022) of the middle sheath unit (202) in a first direction;
a second middle sheath bending drive assembly (12b) drivingly connected to a second middle sheath bending transmission shaft (321) of the middle sheath adapter (3), and configured to adjust the bending angle of the distal end of the middle sheath (2022) in a second direction; and
a middle sheath translation drive assembly (12c) drivingly connected to the middle sheath adapter (3), and configured to drive the middle sheath unit (202) to move axially.

6. The actuation power apparatus according to claim 5, wherein the middle sheath translation drive assembly (12c) comprises a middle sheath translation drive member (121c) and a middle sheath translation mounting plate (122c), wherein the middle sheath translation drive member (121c) has an output end drivingly connected to the middle sheath translation mounting plate (122c), the middle sheath translation mounting plate (122c) is connected to the middle sheath adapter (3), and both the first middle sheath bending drive assembly (12a) and the second middle sheath bending drive assembly (12b) are mounted on the middle sheath translation mounting plate (122c).

7. The actuation power apparatus according to claim 5, wherein the first middle sheath bending drive assembly (12a) comprises:
a first middle sheath bending drive member (121a);
a first middle sheath bending transmission member (122a) having an input end to which the first middle sheath bending drive member (121a) is drivingly connected; and
a first middle sheath bending drive shaft (123a) having a first end connected to an output end of the first middle sheath bending transmission member (122a) and a second end connected to the first middle sheath bending transmission shaft (311).

8. The actuation power apparatus according to claim 5, wherein the second middle sheath bending drive assembly (12b) comprises:
a second middle sheath bending drive member (121b);
a second middle sheath bending transmission member (122b) having an input end to which the second middle sheath bending drive member (121b) is drivingly connected; and
a second middle sheath bending drive shaft (123b) having a first end connected to an output end of the second middle sheath bending transmission member (122b) and a second end connected to the second middle sheath bending transmission shaft (321).

9. The actuation power apparatus according to claim 1, wherein the inner sheath translation drive assembly (13a) comprises:
an inner sheath translation drive member (131a) having an output end connected to the inner sheath translation drive rod (411); and
an inner sheath translation mounting plate (132a) connected to an output end of the inner sheath translation drive member (131a), with the first control assembly (13d), the second control assembly (13e) and the locking assembly (13f) being mounted on the inner sheath translation mounting plate (132a).

10. The actuation power apparatus according to claim 1, wherein the inner sheath rotation drive assembly (13b) comprises:
an inner sheath rotation drive member (131b);
an inner sheath rotation transmission member (132b) having an input end to which the inner sheath rotation drive member (131b) is drivingly connected; and
an inner sheath rotation drive shaft (133b) having a first end connected to an output end of the inner sheath rotation transmission member (132b) and a second end connected to the inner sheath rotation transmission shaft (421).

11. The actuation power apparatus according to claim 1, wherein the open-and-close control assembly (13c) comprises:
an open-and-close drive member (131c);
an open-and-close transmission member (132c) having an input end to which the open-and-close drive member (131c) is drivingly connected; and
an open-and-close drive shaft (133c) having a first end connected to an output end of the open-and-close transmission member (132c) and a second end connected to an open-and-close transmission shaft (431).

12. The actuation power apparatus according to claim 1, wherein the first control assembly (13d) comprises a first drive member (131d) and a first connection rod (132d), the first drive member (131d) having an output end connected to the first connection rod (132d), and the first connection rod (132d) being connected to the first drive rod (441); or
the second control assembly (13e) comprises a second drive member (131e) and a second connection rod (132e), the second drive member (131e) having an output end connected to the second connection rod (132e), and the second connection rod (132e) being connected to the second drive rod (451); or
the locking assembly (13f) comprises a locking drive member (131f) and a locking connection rod (132f), the locking drive member (131f) having an output end connected to the locking connection rod (132f), and the locking connection rod (132f) being connected to the locking drive rod (461).

13. A surgical assistance system comprising a robotic device, an actuation power apparatus (500) and a control device (100), wherein
the robotic device comprises a robotic arm (300) and an actuation power apparatus (500) connected to a distal end of the robotic arm (300), the robotic arm (300) being configured to displace the actuation power apparatus (500);
the actuation power apparatus (500) comprises a catheter system driving module and an adapter module, the adapter module being configured to support a catheter system (200), and the catheter system driving module being configured to actuate the catheter system (200) through the adapter module; and
the control device (100) is electrically connected to the robotic device and has an operating terminal for controlling the robotic device,
wherein the catheter system (200) comprises an inner sheath unit (203), the catheter system driving module comprises an inner sheath driving unit (13), and the adapter module comprises an inner sheath adapter (4), the inner sheath driving unit (13) being drivingly connected to the inner sheath adapter (4) for supporting the inner sheath unit (203), and configured to actuate the inner sheath unit (203) through the inner sheath adapter (4), and the inner sheath unit (203) comprises an inner sheath handle (2031) and an inner sheath (2032), and the inner sheath adapter (4) comprises:

an inner sheath translation transmission unit (41) configured to support the inner sheath handle (2031), the inner sheath driving unit (13) being drivingly connected to the inner sheath translation transmission unit (41) for driving the inner sheath unit (203) to move axially;

an inner sheath rotation transmission unit (42) that has an output end drivingly connected to the inner sheath translation transmission unit (41) and an input end to which the inner sheath driving unit (13) is drivingly connected, for driving the inner sheath unit (203) to rotate about its own axis;

an open-and-close transmission unit (43) having an output end drivingly connected to an inner sheath driving wheel (2033) on the inner sheath handle (2031) and an input end to which the inner sheath driving unit (13) is drivingly connected, for opening or closing a fixation element (204) connected to the inner sheath (2032);

a first transmission unit (44) having an output end drivingly connected to a first operation lever (2034) on the inner sheath handle (2031) and an input end to which the inner sheath driving unit (13) is drivingly connected, for opening or closing one of clamping elements (205) connected to the inner sheath (2032);

a second transmission unit (45) having an output end drivingly connected to a second operation lever (2035) on the inner sheath handle (2031) and an input end to which the inner sheath driving unit (13) is drivingly connected, for opening or closing another of the clamping elements (205) connected to the inner sheath (2032); and a locking transmission unit (46) having an output end drivingly connected to a locking operation lever (2036) on the inner sheath handle (2031) and an input end to which the inner sheath driving unit (13) is drivingly connected, for locking or unlocking the clamping elements (205) and the fixation element (204).

14. The surgical assistance system according to claim 13, wherein the catheter system (200) further comprises an outer sheath unit (201) and a middle sheath unit (202), the catheter system driving module further comprises an outer sheath driving unit (11) and a middle sheath driving unit (12), and the adapter module further comprises an outer sheath adapter (2) and a middle sheath adapter (3), wherein the outer sheath driving unit (11) is drivingly connected to the outer sheath adapter (2) for supporting the outer sheath unit (201), and is configured to actuate the outer sheath unit (201) through the outer sheath adapter (2); and the middle sheath driving unit (12) is drivingly connected to the middle sheath adapter (3) for supporting the middle sheath unit (202), and is configured to actuate the middle sheath unit (202) through the middle sheath adapter (3).

15. The surgical assistance system according to claim 14, wherein the outer sheath unit (201) comprises an outer sheath (2012) and an outer sheath handle (2011), and the outer sheath driving unit (11) comprises:

an outer sheath bending drive assembly (11a) drivingly connected to the outer sheath adapter (2), and configured to adjust bending of a distal end of a distal end of the outer sheath (2012); and an outer sheath rotation drive assembly (11b) drivingly connected to the outer sheath adapter (2), and configured to drive the outer sheath unit (201) to rotate about its own axis.

16. The surgical assistance system according to claim 14, wherein the outer sheath unit (201) comprises an outer sheath (2012) and an outer sheath handle (2011), and the outer sheath adapter (2) comprises:

an outer sheath rotation frame (23) configured to support the outer sheath handle (2011);

a first outer sheath transmission assembly (21) that comprises a first outer sheath transmission shaft (211) having a first end to which the outer sheath driving unit (11) is drivingly connected and a second end in transmission connection to the outer sheath rotation frame (23) to drive the outer sheath rotation frame (23) to rotate about a rotation axis; and a second outer sheath transmission assembly (22) that comprises a second outer sheath transmission shaft (221) having a first end to which the outer sheath driving unit (11) is drivingly connected and a second end in transmission connection to an outer sheath driving gear (2013) on the outer sheath handle (2011) to adjust bending angle of a distal end of the outer sheath (2012).

17. The surgical assistance system according to claim 14, wherein the middle sheath unit (202) comprises a middle sheath (2022) and a middle sheath handle (2021), and the middle sheath driving unit (12) comprises at least one of:

a first middle sheath bending drive assembly (12a) drivingly connected to the middle sheath adapter (3) to adjust a bending angle of a distal end of the middle sheath (2022) in a first direction;

a second middle sheath bending drive assembly (12b) drivingly connected to the middle sheath adapter (3) to adjust the bending angle of the distal end of the middle sheath (2022) in a second direction; and a middle sheath translation drive assembly (12c) drivingly connected to the middle sheath adapter (3) to drive the middle sheath unit (202) to move axially.

18. The surgical assistance system according to claim 17, wherein the middle sheath adapter (3) comprises at least one of:

a middle sheath mounting frame (33) configured to support the middle sheath handle (2021), the middle sheath driving unit (12) being drivingly connected to the middle sheath mounting frame (33) for driving the middle sheath unit (202) to move axially;

a first middle sheath driving assembly (31) that is mounted on the middle sheath mounting frame (33) and comprises a first middle sheath bending transmission shaft (311) having a first end to which the middle sheath driving unit (12) is drivingly connected and a second end in transmission connection to a first middle sheath driving wheel (2023) on the middle sheath handle (2021) for adjusting bending of the middle sheath (2022) in a first direction; and a second middle sheath driving assembly (32) that is mounted on the middle sheath mounting frame (33) and comprises a second middle sheath bending transmission shaft (321) having a first end to which the middle sheath driving unit (12) is drivingly connected and a second end in transmission connection to a second middle sheath driving wheel (2024) on the middle sheath handle (2021) for adjusting bending of a distal end of the middle sheath (2022) in a second direction.

19. The surgical assistance system according to claim 13, wherein the inner sheath driving unit (13) comprises at least one of:
- an inner sheath translation drive assembly (13*a*) connected to the inner sheath adapter (4), and configured to drive the inner sheath unit (203) to move axially;
- an inner sheath rotation drive assembly (13*b*) connected to the inner sheath adapter (4), and configured to drive the inner sheath unit (203) to rotate about its own axis;
- an open-and-close control assembly (13*c*) connected to the inner sheath adapter (4), and configured to drive an inner sheath driving wheel (2033) on the inner sheath handle (2031) to rotate for opening or closing a fixation element (204) connected to the inner sheath (2032);
- a first control assembly (13*d*) connected to the inner sheath adapter (4), and configured to drive a first operation lever (2034) on the inner sheath handle (2031) to move for opening or closing one of clamping elements (205) connected to the inner sheath (2032);
- a second control assembly (13*e*) connected to the inner sheath adapter (4), and configured to drive a second operation lever (2035) on the inner sheath handle (2031) to move for opening or closing another of the clamping element (205) connected to the inner sheath (2032); and
- a locking assembly (13*f*) connected to the inner sheath adapter (4), and configured to drive a locking operation lever (2036) on the inner sheath handle (2031) to move for locking or unlocking the clamping elements (205) and the fixation element (204).

20. The surgical assistance system according to claim 13, wherein the inner sheath translation transmission unit (41) comprises a translation telescopic assembly (412) comprising a telescoping portion (4121) and a fixed portion (4122) that is slidably connected to the telescoping portion (4121), the fixed portion (4122) being fixed, the telescoping portion (4121) being configured to support the inner sheath handle (2031), and the inner sheath rotation transmission unit (42) having an output end drivingly connected to the translation telescopic assembly (412).

21. The surgical assistance system according to claim 13, further comprising a medical cart (400) with the robotic arm (300) being mounted thereon.

* * * * *